US012802541B2

(12) United States Patent
Brown, III et al.

(10) Patent No.: US 12,802,541 B2
(45) Date of Patent: Nov. 17, 2026

(54) QUERYING RFID TAGS BASED ON TAG MOTION

(71) Applicant: Automaton, Inc., San Diego, CA (US)

(72) Inventors: Thomas A. Brown, III, Raleigh, NC (US); Joe Mueller, San Diego, CA (US); Vikas Bollapragada Subrahmanya, San Diego, CA (US); Spencer Hewett, New York, NY (US); Madhan Jaganathan, Cupertino, CA (US)

(73) Assignee: Automaton, Inc., San Diego, CA (US)

( * ) Notice: Subject to any disclaimer, the term of this patent is extended or adjusted under 35 U.S.C. 154(b) by 0 days.

(21) Appl. No.: 18/982,559

(22) Filed: Dec. 16, 2024

(65) Prior Publication Data

US 2025/0118181 A1 Apr. 10, 2025

Related U.S. Application Data

(63) Continuation of application No. PCT/US2023/068845, filed on Jun. 21, 2023.

(60) Provisional application No. 63/354,111, filed on Jun. 21, 2022.

(51) Int. Cl.
*G08B 13/24* (2006.01)

(52) U.S. Cl.
CPC ................................ *G08B 13/2462* (2013.01)

(58) Field of Classification Search
CPC .................................................. G08B 13/2462
USPC ....................................................... 340/572.1
See application file for complete search history.

(56) References Cited

U.S. PATENT DOCUMENTS

| | | | |
|---|---|---|---|
| 7,956,725 | B2 | 6/2011 | Smith |
| 8,307,708 | B2 | 11/2012 | Lin |
| 8,446,255 | B2 | 5/2013 | Balardeta et al. |
| 9,208,306 | B2 | 12/2015 | Davis |
| 9,576,234 | B2 | 2/2017 | Barnes et al. |
| 10,013,860 | B2 | 7/2018 | Hewett |
| 10,386,474 | B2 | 8/2019 | Hewett |
| 10,554,650 | B2 | 2/2020 | Davis |
| 10,614,271 | B2 | 4/2020 | Cossairt et al. |
| 10,839,178 | B2 | 11/2020 | Yeh et al. |
| 10,871,558 | B2 | 12/2020 | Hewett |
| 11,041,770 | B2 | 6/2021 | Fonk et al. |

(Continued)

FOREIGN PATENT DOCUMENTS

| | | | |
|---|---|---|---|
| WO | 2023114976 | A1 | 6/2023 |
| WO | 2023240296 | A1 | 12/2023 |

(Continued)

OTHER PUBLICATIONS

Hande et al. "Energy harvesting for active RF sensors and ID tags." Energy Harvesting Technologies. Boston, MA: Springer US, 2009. 459-492.

(Continued)

*Primary Examiner* — Jack K Wang
(74) *Attorney, Agent, or Firm* — Smith Baluch LLP

(57) ABSTRACT

Methods and apparatus to detect RFID tags in motion or that have moved during a period of time. Inventory records that include locations of tags can be updated quickly and accurately for a large number of RFID-tagged objects in a region by querying and obtaining responses from only the portion of the RFID-tagged objects in the region that have moved or are moving.

20 Claims, 9 Drawing Sheets

(56) References Cited

U.S. PATENT DOCUMENTS

| | | | | |
|---|---|---|---|---|
| 11,043,093 | B2 | 6/2021 | Hewett | |
| 11,112,425 | B2 | 9/2021 | Fonk et al. | |
| 11,215,691 | B2 | 1/2022 | Hewett et al. | |
| 11,408,965 | B2 | 8/2022 | Hewett et al. | |
| 11,543,512 | B2 | 1/2023 | Hewett | |
| 11,915,567 | B2 | 2/2024 | Hewett | |
| 11,933,877 | B2 | 3/2024 | Hewett | |
| 12,013,474 | B2 | 6/2024 | Hewett et al. | |
| 12,117,548 | B2 | 10/2024 | Hewett et al. | |
| 12,164,048 | B2 | 12/2024 | Hewett et al. | |
| 12,541,184 | B2 * | 2/2026 | Espinosa, Jr. | G05B 13/047 |
| 2003/0007473 | A1 | 1/2003 | Strong et al. | |
| 2006/0187031 | A1 | 8/2006 | Moretti et al. | |
| 2007/0182578 | A1 * | 8/2007 | Smith | G06K 19/06 340/572.1 |
| 2007/0282578 | A1 * | 12/2007 | Osogami | G06F 9/44505 703/6 |
| 2008/0224867 | A1 * | 9/2008 | Rehman | G06Q 10/08 340/572.1 |
| 2009/0231135 | A1 | 9/2009 | Chaves et al. | |
| 2011/0036168 | A1 | 2/2011 | Lin | |
| 2013/0234836 | A1 | 9/2013 | Davis | |
| 2014/0061303 | A1 * | 3/2014 | Brandl | G06K 7/10059 235/385 |
| 2015/0002274 | A1 | 1/2015 | Sengstaken, Jr. | |
| 2015/0154427 | A1 | 6/2015 | Barnes et al. | |
| 2017/0372104 | A1 | 12/2017 | Nikitin et al. | |
| 2018/0372775 | A1 | 12/2018 | Fonk et al. | |
| 2019/0128754 | A1 | 5/2019 | Fonk et al. | |
| 2019/0236323 | A1 * | 8/2019 | Trivelpiece | G08B 13/2417 |
| 2020/0019738 | A1 | 1/2020 | Butler et al. | |
| 2021/0073484 | A1 * | 3/2021 | Trivelpiece | G06K 7/10158 |
| 2021/0096151 | A1 | 4/2021 | Fonk et al. | |
| 2021/0097826 | A1 * | 4/2021 | Trivelpiece | G06K 7/10425 |
| 2021/0215482 | A1 | 7/2021 | Fonk et al. | |
| 2021/0302247 | A1 | 9/2021 | Fonk et al. | |
| 2023/0362197 | A1 * | 11/2023 | Condon | H04L 63/20 |
| 2024/0046211 | A1 | 2/2024 | Hewett et al. | |
| 2024/0193381 | A1 | 6/2024 | Brown, III et al. | |
| 2024/0273986 | A1 | 8/2024 | Hewett | |
| 2024/0295623 | A1 | 9/2024 | Hewett et al. | |
| 2024/0302522 | A1 | 9/2024 | Hewett | |
| 2024/0330614 | A1 | 10/2024 | Mueller et al. | |
| 2024/0330619 | A1 | 10/2024 | Morse et al. | |
| 2024/0386375 | A1 | 11/2024 | Dhar et al. | |
| 2025/0045409 | A1 | 2/2025 | Winn | |
| 2025/0094741 | A1 | 3/2025 | Swats et al. | |
| 2025/0102665 | A1 | 3/2025 | Dhar et al. | |

FOREIGN PATENT DOCUMENTS

| | | | |
|---|---|---|---|
| WO | 2023250401 | A1 | 12/2023 |
| WO | 2024196835 | A1 | 9/2024 |
| WO | 2024196837 | A1 | 9/2024 |

OTHER PUBLICATIONS

International Search Report and Written Opinion in International App. No. PCT/US2023/068845 dated Oct. 20, 2023, 16 pages.

* cited by examiner

QUERYING RFID TAGS BASED ON TAG MOTION

CROSS-REFERENCE TO RELATED APPLICATION(S)

This application is a bypass continuation of International Application No. PCT/US2023/068845, filed on Jun. 21, 2023, which claims the priority benefit, under 35 U.S.C. 119(e), of U.S. Application No. 63/354,111, filed on Jun. 21, 2022. Each of these applications is incorporated herein by reference in its entirety for all purposes.

BACKGROUND

Radio-frequency identification (RFID) tags, or simply tags, are low-cost devices that can be attached to objects and offer the promise of automated locating, tracking, sales check-out, and inventory among other commercial and medical applications. There are passive, semi-active, and active types of RFID tags that can be wirelessly interrogated by an RFID reader and emit a wireless radio frequency (RF) reply that includes information stored in the RFID tag, such as a unique tag identification number or unique electronic product code (EPC). Other information can also be included with the reply.

Passive RFID tags have no battery and are therefore typically less expensive than semi-active and active RFID tags. A passive RFID tag is powered by an unmodulated, continuous-wave (cw) RF signal from an RFID tag reader, also called a tag reader, RFID reader, interrogator, reader, or sensor. This cw RF signal powers up the passive RFID tag's circuitry and precedes a query or command from the RFID tag reader in the form of a modulated RF signal. The passive RFID tag receives and demodulates the modulated RF signal and responds to the RFID tag reader by modulating and backscattering a portion of the modulated RF signal. This modulated, backscattered RF signal is the passive RFID tag's reply and is at the same carrier frequency as the RF signal from the RFID tag reader. The replies from passive RFID tags are detected by the RFID tag readers and are typically many orders of magnitude weaker than the RF signals from the RFID tag readers.

The period initiated by a Query command and terminated by either a subsequent Query command (which also starts a new inventory round), a Select command, or a Challenge command is called an inventory round. The tags can reply to the Query command during an inventory round. Each sensor interrogates the tags for the duration of a hop, which can include multiple inventory rounds. A single sensor can repeat hops periodically at different carrier frequencies. For ultrahigh frequency (UHF) passive RFID tags, the carrier frequencies are typically within bands of 865-868 MHz (Europe) or 902-928 MHz (North America). The sensor can continue to query the tags within range periodically, for example, to monitor inventory of objects affixed to the tags.

When performing an inventory process and interrogating a region (e.g., an area in a retail shop, stockroom, or warehouse) having a dense population of RFID tags, there can be hundreds, thousands, or even more tags that attempt to respond to a Query command from an RFID reader. The RFID reader can broadcast the Query command to all tags in range and may elicit responses from the tags according to a time-slotted ALOHA protocol. The RFID reader can also issue a Select command before broadcasting the Query command so that only tags meeting the criteria specified in the Select command respond to the Query command.

If two or more tags reply to the Query command in the same time slot, then their responses may "collide" with each other; that is, the replies from different tags may reach the sensor at the same time or may overlap in time with each other. Complete overlaps are called complete collisions, and partial overlaps are called partial collisions. If the RFID reader cannot resolve the colliding replies, then at least one of the tags must attempt retransmission in another time slot.

To avoid a high number of collisions (where responses from two or more tags occur in the same time slot), the RFID reader uses a Q parameter to determine the number of time slots following the Query command in which the tags can respond. Each tag in the region picks a random number over a range (from 0 to $2^{Q}-1$) that determines during which of the time slots the tag will respond.

An RFID reader can initiate an inventory round for a population of RFID tags by broadcasting a Query command with an initial value for the Q parameter. The RFID reader can increment or decrement the Q parameter according to the response it elicits from the tags. Since the tags are passive devices, they typically do not retain a memory of whether they were inventoried or not after they are powered off. This typically happens at the end of the hop when the RFID reader stops transmitting the cw RF signal. When the same RFID reader gets the next opportunity to conduct an inventory process, the tags that have previously responded to that RFID reader will have no memory of replying and so will participate in the new inventory process. This leads to an inefficient inventory process where the same tags reply in multiple hops. This becomes even more inefficient when the number of tags being inventoried is very high. It also limits an RFID reader's ability to read tags of significance quickly. For example, it increases the time it takes to read tags that have moved since the last inventory process, which may be a small portion of the total number of tags, because the inventory process elicits responses from every tag, whether or not they have moved.

SUMMARY

Conventionally, an inventory round is used to determine which RFID tags are present in a given environment (e.g., a retail store or warehouse). The RFID tags' replies to the queries can also be used to estimate the RFID tags' locations to within centimeters of their actual locations. And conventionally, conducting an inventory round involves interrogating every RFID tag in the environment, whether or not that RFID tag was present during or moved since the last inventory round. The inventors have recognized that once an RFID tag has been inventoried and located, it is generally not necessary to query, inventory, or locate that RFID tag again unless it has moved since the last inventory round. The inventors have further recognized that querying only those RFID tags that have moved in a large population of RFID tags can substantially reduce the amount of time it takes to update inventory records for that population of RFID tags.

To that end, the present technology relates to selecting and locating RFID tags in a particular region (e.g., of a retail shop, warehouse, etc.) and that are moving or have moved since the last inventory round. In other words, the RFID reader can discriminate or select among RFID tags based on motion. For example, tags that have moved since a previous inventory process (and/or since a prior motion-selective command issued by an RFID reader) or that are in motion can be the only tags from among a plurality of RFID tags that are selected to respond to a query by the RFID reader. In some implementations, the detection and indication of motion is performed mainly by the RFID tag. In some cases, the detection and identification of motion is performed mainly by the RFID reader.

Some implementations relate to a method of operating an RFID reader to detect at least one RFID tag that is in motion or has undergone motion in a population of RFID tags during a period of time. The method can include acts of: selecting a first value for a first Q parameter, wherein the first Q parameter determines a number of time slots that each tag in the population of RFID tags can select from to respond to the RFID reader and wherein the first Q value is selected based on a total number of RFID tags in the population of tags; issuing, by the RFID reader, a first query command (612) using the first value at least once; learning first identities of RFID tags in the population of RFID tags that are within the range of the RFID reader (612) and that respond to the first query command; selecting a second value for a second Q parameter that is less than the first value for the first Q parameter, wherein the second value is based on a number of RFID tags in the population of RFID tags that are expected to move during the period of time; issuing a select command (640) that includes a digital mask having at least one bit to solicit a response from only the at least one RFID tag in the population of RFID tags, wherein the at least one bit is selective to identify motion detected by the at least one RFID tag; issuing, by the RFID reader, a second query command (642) using the second value for the second Q parameter at least once; receiving responses to the second query command from only the at least one RFID tag that is in motion or has undergone motion in a population of RFID tags during the period of time; and learning, from the responses, second identities of the at least one RFID tag.

Some implementations relate to a method of detecting motion by a radio-frequency identification (RFID) tag. The method can include acts of: receiving, by the RFID tag, a continuous-wave (CW) signal from an RFID tag reader, the CW signal providing power to a resonant circuit in the RFID tag over a period of time; determining, by the RFID tag, that the fluctuations in the power during the period of time that indicate the RFID tag is moving; in response to determining that the fluctuations in the power indicate the RFID tag is moving, setting a motion-detection bit in a memory of the RFID tag to a first value; receiving, by the RFID tag, a query addressed to only those RFID tags with motion-detection bits having values equal to the first value; and transmitting, by the RFID tag, a reply to the query.

Some implementations relate to a passive RFID tag having motion detection circuitry comprising: a micro-electro-mechanical system (MEMS) device (242, 243) having a flexible beam (245); a capacitor (C1) to be charged or discharged by motion of the flexible beam; a first transistor (M3) having a first current-carrying terminal connected to a first terminal of the capacitor to read out a voltage from the capacitor; and a second transistor (M2) having a second current-carrying terminal connected to the first terminal of the capacitor and a second current-carrying terminal connected to a second terminal of the capacitor to clear charge accumulated on the capacitor.

Some implementations relate to a method of identifying at least one radio-frequency identification (RFID) tag that is moving or has moved during a span of time in a population of RFID tags. The method can include acts of: transmitting, by an RFID tag reader, a continuous-wave (CW) signal to RFID tags in the population of RFID tags within range of the RFID tag reader, the CW signal providing power to respective motion-detection circuits in the RFID tags in the population of RFID tags over a first period of time, each motion-detection circuit configured to detect motion of the corresponding RFID tag in the population of RFID tags during the first period of time and during a second period of time when there is no CW signal providing power to the respective motion-detection circuits; not transmitting, by the RFID tag reader, the CW signal for the second period of time; transmitting, by the RFID tag reader, a query addressed to the at least one RFID tag in the population of RFID tags for which motion has been detected by the motion-detection circuit during the span of time spanning at least the second period of time; and receiving, by the RFID tag reader, a reply to the query from only the at least one RFID tag.

Some implementations relate to a method of scanning for a radio-frequency identification (RFID) tag. The method can include acts of: detecting movement of the RFID tag; in response to detecting movement of the RFID tag, changing a bit in a memory of the RFID tag from a first value to a second value indicating that the RFID tag has moved since last being queried; receiving, by the RFID tag, a query for RFID tags with the bit set to the second value; transmitting, by the RFID tag, a response to the query; and setting the bit in the memory of the RFID tag from the second value to the first value indicating that the RFID tag has not moved since last being queried.

Some implementations relate to a method of identifying and locating radio-frequency identification (RFID) tags that have moved since a first query. The method can include acts of: broadcasting, by an RFID tag reader, a first query to a plurality of RFID tags in a region, wherein the first query uses a first value for a first Q parameter that is based on a total number of the plurality of RFID tags, the first Q parameter determining a number of time slots in which the plurality of RFID tags can respond to the first query; broadcasting, by the RFID tag reader a period of time, a second query to a plurality of RFID tags in the region, wherein the second query uses a second value for a second Q parameter that is smaller than the first value and is based on a number of the plurality of RFID tags that are expected to move during the period of time and wherein the second query is selective to only RFID tags in the plurality of RFID tags that have moved during the period of time; receiving, by the RFID tag reader, a response to the second query from an RFID tag of the plurality of RFID tags that has moved since receiving the first query; and estimating, based on the response, a location of the RFID tag.

Some implementations relate to a method of identifying and locating radio-frequency identification (RFID) tags. The method can include acts of: transmitting, by an RFID tag reader, a query to a plurality of RFID tags, the query requesting information about movement of RFID tags in the plurality of RFID tags since a previous query; receiving, by the RFID tag reader, a response to the query from a first RFID tag in the plurality of RFID tags, the response indicating that the first RFID tag has moved since receiving the previous query; and in response to receiving the response indicating that the first RFID tag has moved since receiving the previous query, estimating a current location of the first RFID tag and/or a change in location of the first RFID tag based at least in part on the response to query from the first RFID tag.

Some implementations relate to a method of locating moving radio-frequency identification (RFID) tags. The method can include acts of: broadcasting, by an RFID tag reader, a query to RFID tags using a first carrier wave at a first carrier frequency; receiving, by the RFID tag reader, a response to the query from a moving RFID tag that is backscattered in a second carrier wave at a second carrier frequency Doppler-shifted from the first carrier frequency by a frequency shift proportional to a velocity of the moving RFID tag relative to the RFID tag reader; determining, by the RFID tag reader, that the moving RFID tag is moving based on mixing the second carrier wave with a signal from a local oscillator of the RFID tag reader operating at the first carrier frequency; and in response to determining that the moving RFID tag is moving, estimating a location of the moving RFID tag based on the response to the query.

Other implementations include a method of locating an RFID tag that has moved since a last inventory process or other query. Examples of this method include acquiring at least one image of an object with a camera. A controller or appliance operably coupled to the camera determine, based on the image(s), that the object and an RFID tag attached to the object have moved since the RFID tag was last queried and identifies, based on the at least one image, a region to which the RFID tag has been moved. An RFID tag reader operably coupled to the appliance transmits, a query to the region to which the RFID tag has been moved and detects a response from the RFID tag to the query. The RFID tag reader or appliance estimates a location of the RFID tag based on the response.

Yet other implementations include a method of selectively querying an RFID tag that has moved since last queried. An RFID tag reader or other wireless signal source wirelessly charges a motion detection circuit of the RFID tag, for example, with a continuous-wave RF signal, which may be at a carrier frequency outside of a band used for communication with the RFID tag and/or at an amplitude below an activation threshold of the RFID tag. The motion detection circuit can also be charged with a query from another RFID tag reader to another RFID tag. The motion detection circuit detects motion of the RFID tag and, in response to detecting the motion, sets a motion-detection bit in a memory of the RFID tag to a first value indicating that the RFID tag has moved since last being queried by an RFID tag reader. The RFID tag receives a query addressed to only those RFID tags with motion-detection bits having values equal to the first value and transmits a reply to the query. In response to receiving the query, the motion-detection bit in the memory of the RFID tag can be set to a second value indicating that the RFID tag has not moved since last being queried by an RFID tag reader.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

DETAILED DESCRIPTION

Figure 1A:
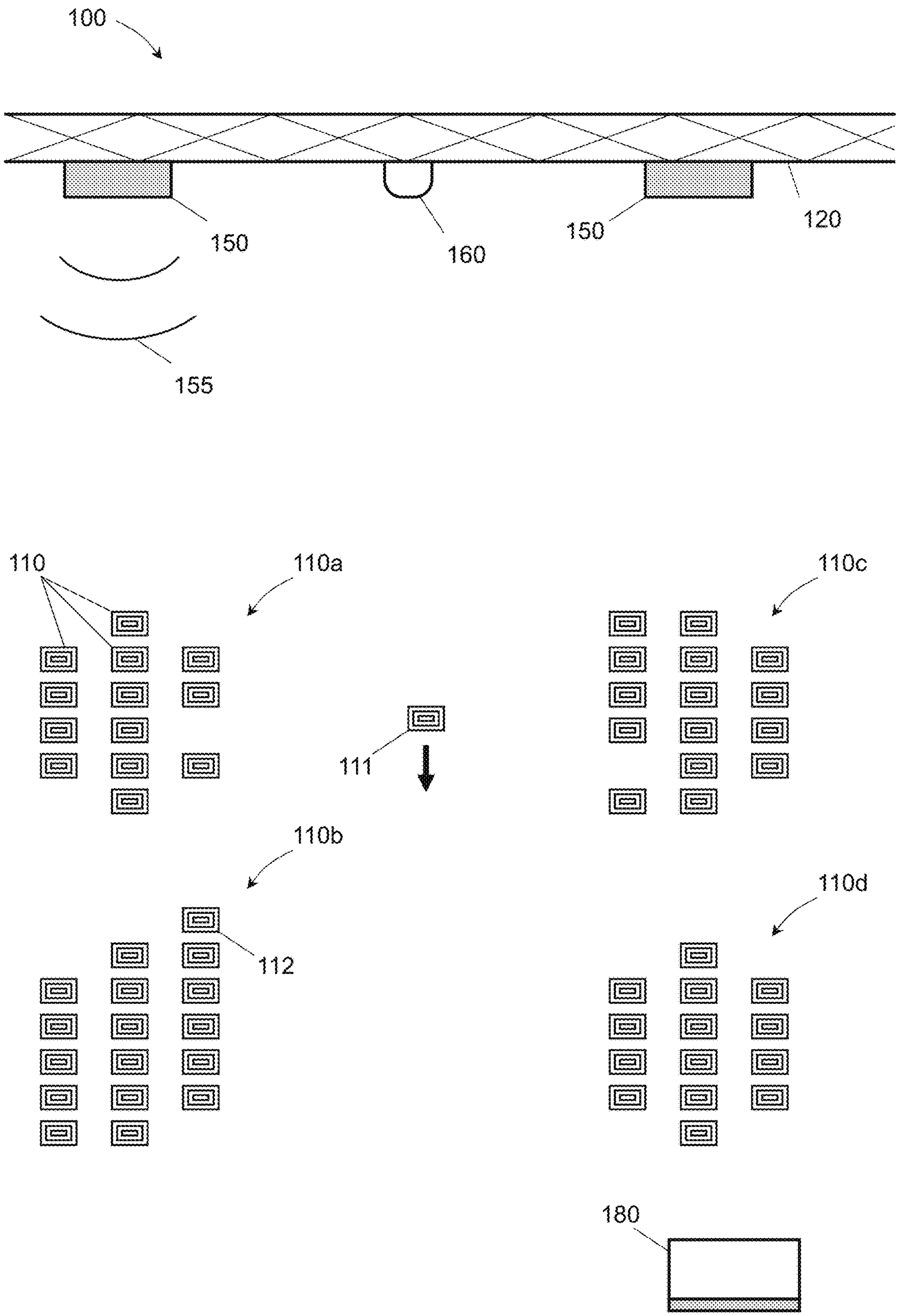
FIGS. 1A and 1B depict an RFID environment containing RFID tags and RFID readers to interrogate at least a subset of the RFID tags in the environment.

As described above, performing an RFID inventory in a region having a large number of objects to which RFID tags are attached can involve an appreciable amount of time learning the identity of each RFID tag in the region. Further, determining the location of each tag in the region can take an even longer amount of time whether locating each tag with manual assistance and/or using a fully automated RFID tag-locating process.

The inventors have recognized and appreciated that the inventory process can become more complex and time consuming when there are many RFID tags distributed over a large region (e.g., hundreds to thousands of RFID tag distributed over a warehouse or large retail store) where RFID readers may be distributed over the area and time-share frequency bands and/or use beam steering to interrogate RFID tags in the large region. Additionally, with a large number of tags, some tags may not be able to respond within the time span of a single hop (time span of communications between RFID reader and tags at a given carrier frequency) that executes an inventory process. Because of beam steering or time-sharing, tags in an inventory region may lose power momentarily (e.g., if the beam steers away temporarily or the local RFID reader powers down to let a nearby RFID reader share the frequency band). The loss of power can cause some RFID tags to forget their inventoried status (e.g., lose an inventoried flag status or other value in volatile memory that indicates the tag has already responded to an inventory query). As such, the RFID tag will respond again to an RFID reader's inventory query upon powering up, even though the tag has already been inventoried. Additionally, tags that could not respond in a prior inventory hop can attempt to respond in a subsequent inventory hop. Because of such forgetting, repeated responses, and responses from tags that could not respond in a prior inventory hop, it may not be possible to reduce the Q parameter value beyond an initial value that is used to inventory every tag in the region accessed by the RFID reader. With no reduction in the Q parameter, the inventory process can take even longer than the time it would take to inventory the same number of tags in a region where every tag remains powered throughout the inventory process.

The inventors have recognized and appreciated that after an initial inventory has been performed to identify and locate RFID tags (and their attached objects) in a region, it typically is not necessary on subsequent inventories to re-identify and relocate each and every tag in the region. For example, many or most of the RFID tags may not have moved since the previous inventory results were recorded so that it may not be necessary to re-identify and relocate the same, stationary RFID tags. Instead, useful information to update the inventory record can be obtained from a subset of the RFID tags in the region that have moved since the previous inventory process was completed (and/or since a previous motion-selective command) and/or that are in motion when issuing a motion-selective command for purposes of updating an inventory record. For example, the tags that have moved since the previous inventory record was completed or that are in motion may have (1) left the premises representing a depletion in inventory, (2) moved from and returned to their original location (e.g., after being tried, viewed, or tested), (3) moved from and (potentially mistakenly) returned to a different location on the premises (representing a misplaced item), or (4) moved into the region (e.g., from another storage area). By interrogating only those tags that have moved or are in motion and updating records for those tags, an accurate updated inventory record (having object identity, quantity, and location) can be obtained with a considerable reduction in the total inventory time compared to performing an inventory process for each and every tag in the region.

I. RFID Environment and Overview

Figure 1B:
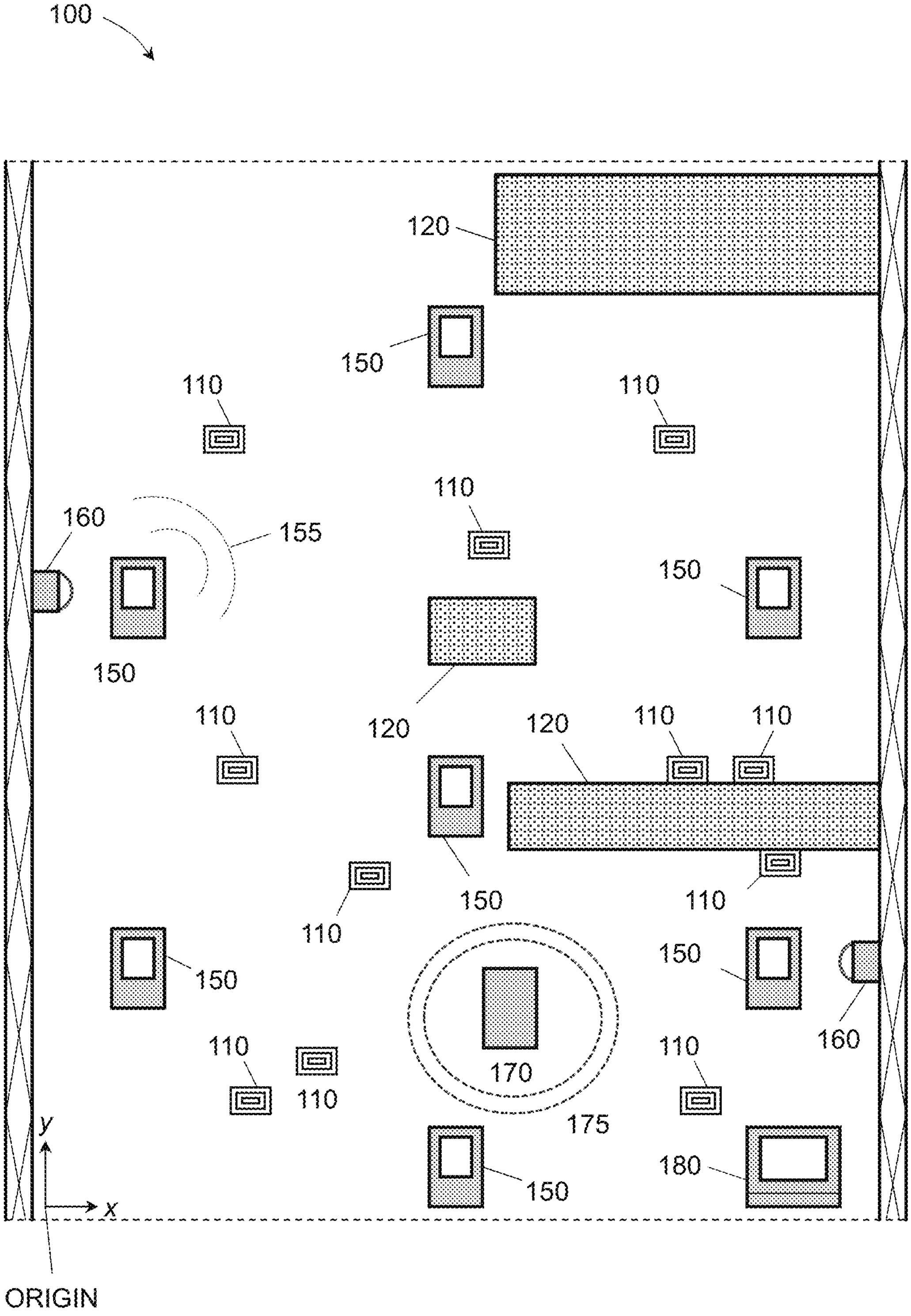

FIGS. 1A and 1B depict an RFID environment 100 in which selectively querying RFID tags based on tag motion can be practiced. The environment may be a retail store, warehouse, stockroom, storage space, library, museum, art gallery, hospital, etc. The environment 100 can include a large plurality of objects (not shown to simplify the drawing) each tagged with its own unique RFID tag 110. There can be hundreds, thousands, or more of such tagged objects in a region that is interrogated by at least one RFID reader 150.

There can be many RFID tags 110 in the RFID environment 100, with each RFID tag attached to a different object. For example, a first plurality of RFID tags 110*a* (and their attached objects) can be located in a first region of a warehouse or store (which may be along a first aisle). A second plurality of RFID tags 110*b* can be located in a different region along the same aisle or a different aisle. A third plurality of RFID tags 110*c* and a fourth plurality of RFID tags 110*d* can be located in different regions of a second aisle or a separate stockroom.

There can be one or more RFID readers 150 in the RFID environment 100 to interrogate the RFID tags 110. The RFID reader(s) can be mounted to a stationary fixture 120 or otherwise held stationary while performing inventories. The RFID reader(s) 150 may further be held stationary between performing successive inventories. In some implementations, the RFID reader(s) can be mounted to a ceiling, wall, or furnishing (e.g., shelving, racks, cabinets, table, etc.) in the RFID environment 100. Mounting the RFID reader(s) to the ceiling 120 can provide a better vantage point for which RFID signals are less obstructed by furnishings and people. The RFID reader(s) 150 may operate in an ultra-high frequency band (e.g., 902 to 928 MHz in the United States or 865 to 868 MHz in Europe) when interrogating RFID tags and listening for responses from tags.

In some implementations, the RFID reader(s) 150 can each have one or more phased antenna arrays to emit a directional RF interrogation beam 155 so that only a portion of the total number of RFID tags 110 in the environment can be interrogated at a time (e.g., only the first plurality of RFID tags 110*a* and the second plurality of RFID tags 110*b*). The phased antenna array on a reader can also be used to directionally receive responses from RFID tags (e.g., spatially filter tag responses) so that responses from only a selected group of tags is received by the RFID reader. The direction of RF emission and reception by a phased antenna array can be steerable by changing relative phases between the antennas in the phased antenna array. RFID readers with phase antenna arrays can aid in tag location processes.

The RFID environment 100 can also include one or more cameras 160 that can record still and/or motion videos of one or more regions in the environment. The recorded images can be useful for detecting, evaluating, and/or confirming motion of tags. The camera(s) 160 and RFID reader(s) 150 can be in communication with a master processor 180, also called a central controller, controller, or appliance. The master processor 180 can be a local or remote computer or smart phone. In some cases, the master processor 180 can be implemented as a server. For a local computer, the communication may be over a wired or wireless link. Remote communication may be via the world wide web. The master processor 180 can include and execute code to control read actions by the RFID reader(s) 150 and to receive and process data from RFID reads by the readers. The master processor 180 may further create and maintain inventory records and may perform automated purchase orders based on inventory records. The master processor 180 may further manage sales (e.g., assisted check-out and self-check-out) actions and create and maintain sales records.

The master processor 180 can further control image and/or video acquisition with the camera(s) 160 and process obtained images and/or videos. In some cases, the master processor 180 can coordinate imaging with detection of RFID tag motion. For example, when an RFID reader 150 receives a signal indicating that a tag is in motion, the master processor 180 can control the camera(s) 160 to acquire/record a still image or video image of the region in which the tag was last known to exist.

The master processor 180 can also detect motion of tagged objects and/or of tags themselves in images acquired by the camera(s) 160 and use that motion to trigger queries of potentially affected tags by the nearby RFID reader(s) 150. For instance, the camera 160 may acquire a video or series of still images of a person walking from a first sales rack to a second sales rack with an object in hand, then walking away from the second sales rack emptyhanded. Without necessarily recognizing the object itself or the tag attached to the object, the master processor 180 can nevertheless determine from the images or video that an object has moved from the first sales rack to the second sales rack. In response to this movement, the master processor 180 can command an RFID reader above the first sales rack to conduct an inventory round of tags on the first sales rack and/or command an RFID reader above the second sales rack to conduct an inventory round of tags on the second sales rack. (Depending how far the object has moved, a single RFID reader may be able to inventory both sales racks.) Each inventory round can be limited to only the items on the respective sales rack, e.g., using appropriate beam-steering techniques for transmitting queries and detecting replies, reducing the amount of time it takes to determine which tag(s) and associated object(s) have moved and to update the inventory records accordingly.

The master processor 180 may update sales and inventory records on a daily basis or for shorter intervals (hourly in some cases). As one example, the master processor may perform a detailed initial inventory of tagged objects in the RFID environment 100 at the beginning and/or end of each day or at a designated time selected by a user. A selected time may be a time during which most or all RFID-tagged objects in the environment are stationary, such as when the store is closed (e.g., at night or in the early morning), though some tags can be moving during an inventory process. The initial inventory can include, beyond learning the identity of each tag in the region and/or of each attached object, performing tag-locating tasks to determine the location (e.g., aisle, section, shelf) of each RFID tag 110 and attached object in the RFID environment 100. Examples of tag-locating tasks are described in International Application No. PCT/US2023/068318, filed Jun. 12, 2023, and entitled "Estimating RFID Tag Locations from Multiple Data Inputs," and in International Application No. PCT/US2023/061645, filed Jan. 31, 2023, and entitled "Stateful Inventory for Monitoring RFID Tags," by the same applicant and herein incorporated by reference in its entirety. Alternatively, or additionally, tag and object location can be performed, at least in part, using conventional inventory methods with hand-held RFID readers and manual entry of tag location. The master processor can then store in an inventory database each tag identification (TID) and/or EPC in association with the object to which the tag is attached and a location for the tag and object.

During business hours, some RFID tags 110 (and their attached objects) may move as customers, salesclerks, or stocking clerks remove objects from their locations for viewing, fitting, or shipping and/or add new tagged objects to the region. In some cases, during a day of business, many or most of the tagged objects may not move. Since these stationary tags (and the associated objects) were already identified and located during the previous inventory process, there is no need to query, identify, and locate them again. Their corresponding portion of data in the inventory record (which can be the majority of data in the record) remains unchanged. In the subsequent inventory process, only the subset of RFID tags 110 that have moved or are in motion need be queried to determine their identity and location. By omitting the non-moved tags from a subsequent inventory process, the amount of time to update the inventory record can be reduced substantially (e.g., by a factor of two or more).

To update the inventory records by performing a subsequent inventory process, the RFID tags that have moved since the previous inventory process for which tags were located or that are currently in motion can be selectively queried to determine TID and/or EPC and tag location. For example, when a broadcasted query is issued for the subsequent inventory process, the query selects only the RFID tags that have moved since the previous inventory process or that are in motion. In many cases, this subset of tags can be significantly fewer in number than the total number of RFID tags 110 in the region. As explained below, the reduced number allows a smaller Q value to be chosen for a query, greatly reducing the amount of time to identify and locate moved and/or moving tags. This subset of tags (which is discriminated based on motion) can be interrogated to determine whether (1) the RFID tag has been returned to its correct location, (2) has been misplaced (indicated by misplaced tag 112 in FIG. 1A), (3) is in motion (indicated by moving tag 111), (4) is added to the region (e.g., newly stocked object in the region) or, under some circumstances, or (5) is absent from the region (e.g., legitimately or illegitimately removed from the environment).

II. Detecting Tag Motion

There are several ways to determine whether an RFID tag 110 has moved or is moving during a time interval. Some techniques for detecting motion can be implemented primarily with the RFID tag 110. Some techniques for detecting motion can be implemented primarily with the RFID reader 150. Some of the processes for detecting motion of an RFID tag can be used together (e.g., to confirm motion of a tag).

II. A. Tag Circuitry Overview

Figure 2A:
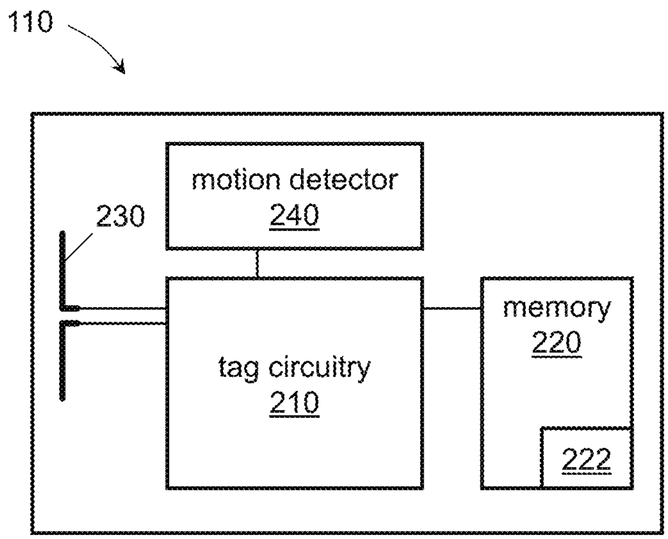
FIG. 2A depicts an RFID tag that includes a motion detector and can be used in the RFID environment of FIG. 1.

FIG. 2A depicts an RFID tag 110 configured for detection of motion primarily by the tag. The RFID tag includes an antenna 230 (such as a dipole antenna) to receive an RF signal from the RFID reader 150, tag circuitry 210, and memory 220. The RFID tag 110 further includes a motion detector 240. For passive RFID tags, power harvested from the RF carrier wave transmitted by the RFID reader 150 can be used to power up the RFID tag 110 and provide power for a backscattered response from the tag. The power harvested from the RF carrier wave can also be used to supply power for motion detection. For active RFID tags, an on-board battery (not shown) can provide power for responding to an interrogation by an RFID reader 150 and for motion detection.

Figure 2B:
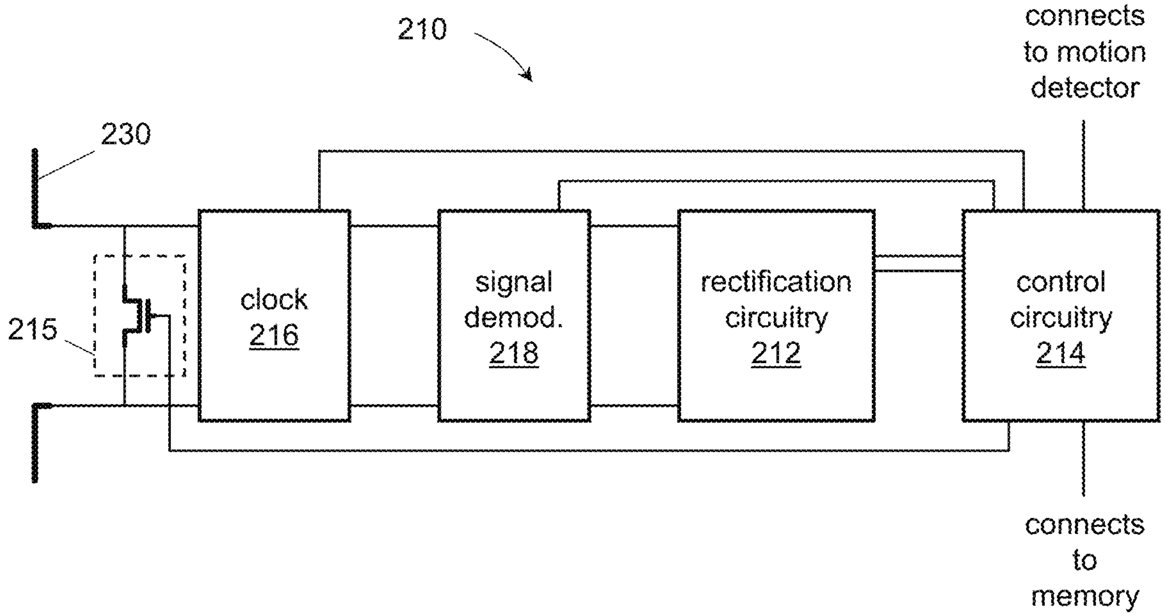
FIG. 2B illustrates an example of circuitry that can be included in the RFID tag of FIG. 2A.

The tag circuitry 210 is in communication with the antenna 230, memory 220, and the motion detector 240. An example of tag circuitry 210 is shown in FIG. 2B. For passive tags, the tag circuitry can include rectification circuitry 212 to harvest power from the RF waveform received by the antenna 230. The antenna 230 and circuit elements in the rectification circuitry 212 may form a resonant circuit having an inductor and capacitor to couple power from the antenna for signal reception and power rectification. Power output from the rectification circuit can be used to power transistors and logic circuitry in the control circuitry 210 as well as provide power to the memory 220 and motion detector 240 is some cases.

The tag circuitry 210 can further include a clock recovery circuit, which can recover a clock signal from the RF carrier wave, for example. The clock signal can be provided to the control circuitry 214 to clock instructions for operating the RFID tag and to control read/write rates for accessing the memory 220. The tag circuitry 210 can also include a signal demodulation circuit 218 to demodulate a signal from the RFID reader 150 that is encoded on the RF carrier wave. The decoded signal can include one or more commands and/or responses used to interact with the RFID tag 110. Examples of commands include Query, QueryRep, QueryAdjust, Select, and other mandatory and optional commands defined by the EPC™ Radio-Frequency Identity Protocols Generation-2 UHF RFID Standard, Release 2.1 (2018). Examples of responses include ACK (acknowledge) and NAK (not acknowledged). The decoded signal may also include custom and proprietary commands as well as mandatory and optional commands subsequently adopted by the UHF RFID Standard. Commands and responses decoded by the signal demodulation circuit 218 can be provided to the control circuitry 214 for execution.

Information transmitted by the RFID tag 110 to the RFID reader 150 can be encoded on a backscattered signal by a backscatter modulator 215. The backscatter modulator 215 can include at least one transistor that is controlled by the control circuitry 214 to encode the information onto the backscattered wave. Switching the transistor can change the backscatter properties of the antenna 230 and strength of the backscatter signal.

The control circuitry 214 can process the received commands and/or responses from the RFID reader 150 and determine if the tag should respond and how the tag should respond. The control circuitry can include programmable gate arrays to execute tag functionality. The control circuitry can include a random number generator and counter that are used when responding to Query commands. The control circuitry can further include read/write circuitry that is used to read information from and write information to memory 220. When responding to a Query command, the control circuitry 214 may retrieve information from memory (e.g., some combination of TID, EPC™, and SKU data) and encode the information onto the backscattered wave.

Other tag information that can be stored in memory 220 and which may be transmitted to the RFID reader 150 includes, but is not limited to: type of tag, serial number of tag, serial number of product, operating frequency, cyclical redundancy check (CRC) values, random number values, password and authentication information. According to the UHF RFID Standard mentioned above, the memory 220 includes four memory banks: User memory, TID memory, EPC™ memory, and Reserved memory. User memory is open for any user of the RFID tag 110 to write data to and read data from the allocated memory locations. There are some restrictions on what can be written to TID memory and EPC™ memory in addition to tag identifying and electronic product code information, respectively. There are some restrictions on what can be written to Reserved memory (passwords) and how the Reserved memory can be accessed.

Referring again to FIG. 2A, to track motion of an RFID tag 110, the information stored in memory 220 can also include a motion identifier 222 (e.g., at least one bit) that can be used to identify whether the tag has moved during a time interval. The motion identifier 222 can be a single non-volatile memory bit, or a number of non-volatile memory bits that may be external to memory 220. In some cases, the motion identifier 222 can be implemented as a flag in memory. A logic HI can be used to indicate that the tag has undergone motion during the time interval and a logic LO can indicate that the tag has not undergone motion, or vice versa. The motion identifier 222 can be stored in User memory. In alternative implementations, the motion identifier 222 can be stored in TID memory or EPC™ memory (e.g., appended to an entry in either memory).

The time interval for which motion is indicated or not indicated by the motion identifier can be an interval since the motion identifier 222 was last reset to a non-motion status by an RFID reader 150. The resetting of the motion identifier 222 can occur following an inventory process for which the location of the RFID tag 110 is determined. For example, once the tag's location is known, the motion identifier 222 can be reset to a stationary status by the RFID reader 150. Any subsequent motion of the tag can set the motion identifier to a moved or moving status to effectively indicate that the tag's location should be redetermined and its inventory record updated. Conversely, tags that have not moved (motion identifier 222 indicating a stationary or motionless status) since their locations were determined need not have their locations determined nor their inventory records updated.

There are at least two ways in which each tag having a motion identifier 222 that indicates motion can be read. The first way is to read the tag to determine its location and its identification. The second way is to read the tag to determine its identification but not its location while reading the tag. The tag's location may or may not be estimated as part of each reading process (e.g., estimated based at least in part on RSSI and/or AoA). In some implementations, the motion identifier 222 can be reset to a non-motion status after each read of the tag (with its motion identifier 222 indicating motion) by the RFID reader 150, whether or not the tag's location is determined during the read. That is, the motion identifier can be reset even though the tag's location has not been determined. In such implementations, the RFID reader (s) 150 and/or master processor 180 can maintain a motion record that records the identity of each tag that has moved since a previous inventory process for which the tag was located (or since a previous motion-selective command by an RFID reader) or is currently moving. When an inventory process is performed, only tags identified in the motion record database can be selected for the inventory round and have their locations determined. Resetting the motion identifier 222 after each read can keep the Q value low for each Query command issued by the RFID reader 150, as explained further below.

Not resetting the motion identifier 222 after each read can eliminate maintaining a motion database to keep track of moved tags and may be acceptable when the total number of tags that move between inventory processes for which the tags are located is a small fraction of the total number of tags in the region (e.g., less than ⅓$^{rd}$). In such an implementation, the RFID tags collectively form a motion database by retaining their motion status until an inventory of the moved tags is performed and the moved tags are located. After a tag (which has moved or are moving) has been located, its motion identifier can be reset to a stationary status.

II.B. RFID Tag Circuits for Detecting Motion

There are several ways in which an RFID tag can detect and indicate motion. A first way is using an on-board micro-electro-mechanical system (MEMS) accelerometer that can be fabricated as at least part of the integrated circuitry of the motion detector 240. The output of the accelerometer can be provided to the control circuitry 214 for processing. To simplify circuitry and reduce tag cost, the accelerometer can be configured to sense acceleration in only one direction. In response to changes in detected acceleration or in acceleration exceeding a threshold value, the control circuitry 214 can set the motion identifier 222 to a motion status. Apart from cost, such an accelerometer uses power to sense acceleration and the control circuitry uses power to process the signal received from the accelerometer and to write data to the motion identifier 222.

When a powered motion detector is used to detect motion (e.g., sense acceleration) and change the status of the motion identifier 222, a passive RFID tag may be disadvantaged compared to an active RFID tag. The active RFID tag can provide power from its on-board power source (e.g., battery or solar cell) to detect motion at any time. By sensing motion for a brief amount of time $T_s$ (e.g., for less than 1 second) and repeatedly (e.g., with a periodicity $T_p$ having a value in a range from 5 seconds to 5 minutes), the power consumed by sensing and indicating motion can be reduced and mitigate draining of an active tag's battery or reduce an amount of power consumed for detecting motion in a passive RFID tag. Methods of detecting significant motion with a passive tag are described below that do not require continuous powering of the passive tag. For example, with low Q values, it can be possible to query all tags in a region repeatedly and frequently (e.g., at a periodicity of 5 seconds or less). The queries can capture tags that are undergoing sustained motion that lasts longer than the periodicity of the repeated queries. In some implementations, once a tag detects motion, operation of the motion detector 240 can be disabled (drawing no further power) until the tag has been read and identified as moving or having moved.

Figure 2C:
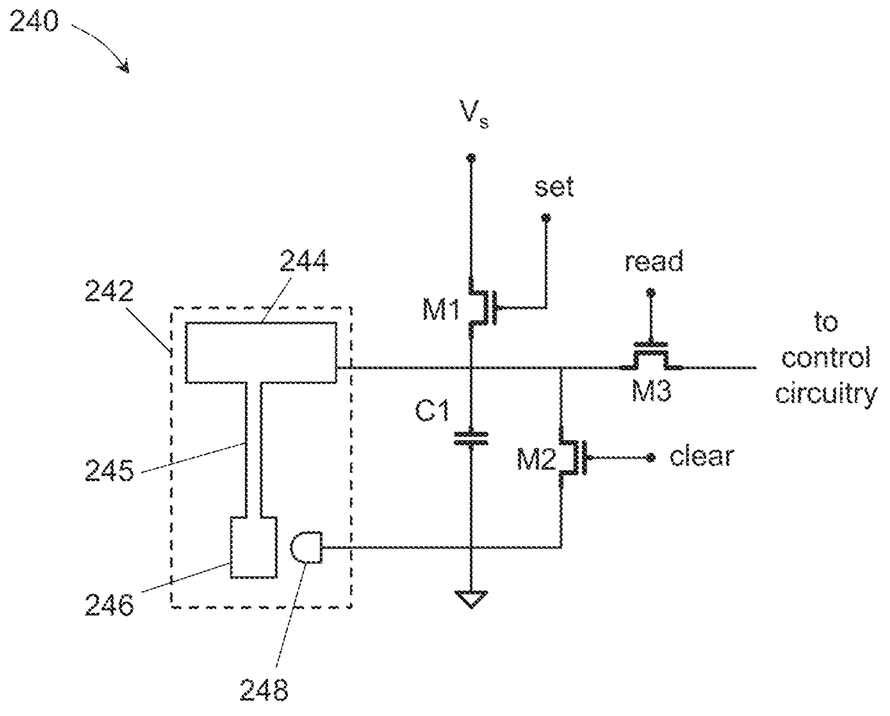
FIG. 2C depicts an example of motion detection circuitry that includes a MEMS device and is suitable for use in the RFID of FIG. 2A.

Another approach that may use less power and be easier to implement is to use motion detection circuitry 240 comprising elements shown in FIG. 2C. The motion detection circuitry can include a capacitor C1, three transistors (M1, M2, M3), and a MEMS switch 242. The MEMS switch 242 can include a fixed base 244, a flexible beam 245, a mass 246 connected to the flexible beam, and a contact 248. The fixed base 244, flexible beam 245, and mass 246 can be microfabricated from conductive silicon (e.g., heavily doped silicon) and normally be electrically isolated from the contact 248, which may also be formed from conductive silicon. The flexible beam can be a cantilevered beam. In some cases, the flexible beam 245 may provide sufficient mass and there may not be a distinct mass 246 connected to the end. In some cases, the flexible beam is fixed at both ends and the contact 248 is located near the center of the beam. The beam's center can deflect to make electrical connection to the contact.

In operation, the capacitor C1 can be charged to a voltage Vs with transistor M1, and then transistor M1 opened. The charging of the capacitor can be performed before, during, or after an inventory process for which the RFID tag 110 is located. As noted above, with low Q values, it can be possible to query all tags in a region repeatedly and frequently so that the queries can provide power to all tags in the region to recharge or top-off charge on the capacitors C1 for tags that have not moved. If the capacitors can be topped off frequently, the capacitor size can be reduced (e.g., to a value less than 1 microfarad). The charge is then retained by capacitor C1, provided the tag does not move. Should motion of the RFID tag 110 occur, then flexible beam 245 can flex such that the end of the beam or mass 246 makes electrical contact with contact 248. The electrical contact shunts and discharges the capacitor C1, reducing the voltage across the capacitor (e.g., from approximately or exactly $V_s$ to approximately or exactly 0 volts). The reduction of voltage (indicating tag motion) can be detected upon readout of the detector using transistor M3. If no motion occurs, then the initial voltage can be detected upon read-out of the circuit. Transistor M2 can be used to clear charge on the capacitor C1 (e.g., when testing the motion detector). The set, read, and clear inputs can connect to control circuitry 214.

The motion detection circuitry 240 of FIG. 2C can operate on less power than a circuit having a conventional accelerometer which outputs a signal for the control circuitry 214 to process. A desirable feature of the motion detection circuitry 240 of FIG. 2C is that it can detect motion at any time, whether or not the RFID tag 110 is powered, provided the capacitor can retain detectable charge until the MEMS switch 242 closes. In this regard, MEMS switch 242 harvests energy from movement of the tag to activate the switch and discharge capacitor C1. The charging of capacitor C1 can be performed prior to powering down the RFID tag. Readout of the capacitor can be performed when powering up the tag. For example, once the RFID tag has sufficient power from the RF carrier wave for control circuitry 214 to operate, the control circuitry can read the voltage status from the capacitor and write a corresponding motion identifier 222 value to memory 220 (e.g., prior to determining whether to respond to an RFID reader's Query and/or Select command(s)).

The motion detection circuitry 240 of FIG. 2C may be so sensitive that just about any motion triggers the MEMS switch 242. This may be undesirable if the goal is to query only those tags that have been moved to a significantly different location. On the other hand, this level of sensitivity to motion allows the motion detector—and hence the RFID reader—to detect if an object attached to the tag was viewed briefly and returned to its original location. Knowing that an object has been viewed briefly but not moved or purchased can be used to determine whether that object should be priced differently, moved to another location (e.g., the sale rack), etc. It can also be used to compare the effectiveness of different displays or locations for selling objects or particular types of objects.

Figure 2D:
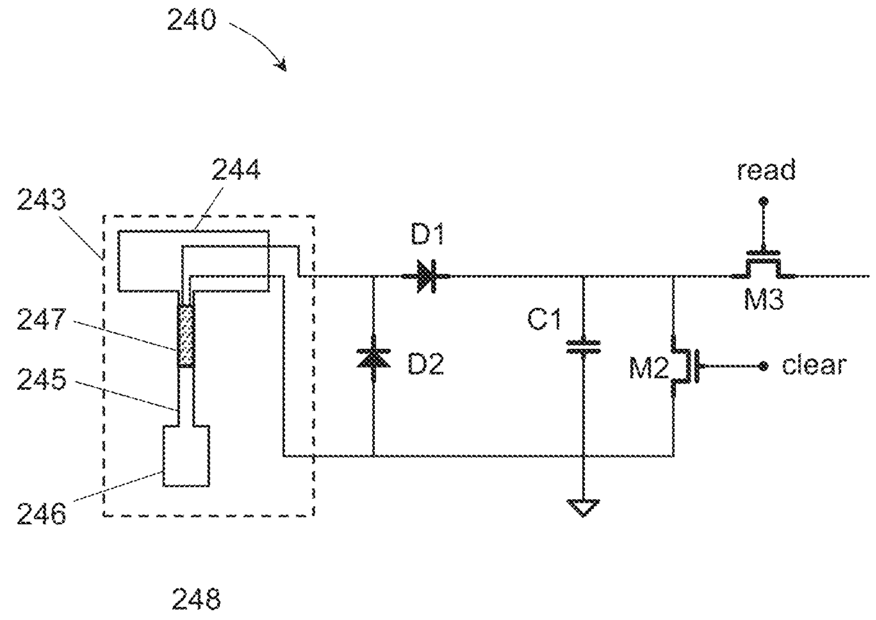
FIG. 2D depicts an alternative example of motion detection circuitry that includes a MEMS device and is suitable for use in the RFID of FIG. 2A.

FIG. 2D depicts motion detection circuitry 240 that also can harvest energy from motion of the RFID tag 110. The circuitry includes an energy harvester 243 that outputs and electrical current to charge capacitor C1 in response to movement of the RFID tag 110. For the illustrated example, the energy harvester 243 includes a MEMS electro-mechanical generator having a flexible beam 245 attached to a fixed base 244. The flexible beam 245 may include a mass 246 connected to one end of the beam. A piezoelectric (PZT) film 247 is deposited on the flexible beam 245. In response to movement of the RFID tag 110, the flexible beam 245 can oscillate with its free end (and mass 246) swinging back and forth. The oscillatory motion can strain the PZT film 247 producing an alternating current. The current can be half-wave rectified by diodes D1, D2 (or other rectification circuitry) to charge capacitor C1. The charge and voltage can remain on C1 until readout by transistor M3 or clearing by transistor M2. In other implementations, full-wave rectification can be used. Detection of a voltage across the capacitor C1 on readout can indicate that the RFID tag 110 has undergone motion or is moving. The absence of any voltage across C1 can indicate that the tag has been stationary since a last readout.

In operation, the capacitor C1 can be discharged before, during, or after performing an inventory process for which location of the RFID tag is determined. Subsequently, whenever the RFID tag is moved, charge and voltage can accumulate on capacitor C1. Upon power up of the RFID tag, the voltage can be read out with transistor M3 and processed by control circuitry 214. For example, if a voltage across C1 exceeds a predetermined threshold value, then the control circuitry 214 can set the motion identifier 222 to indicate a motion status. In some cases, the energy harvester 243 may provide enough energy to power at least a portion of the RFID tag circuitry. For example, the energy provided from the energy harvester 243 may be enough to readout the voltage on the capacitor C1, determine whether motion has occurred, and set the motion identifier 222 to an appropriate status.

To distinguish between different types of motion of the tag (e.g., jostling, brief viewing of the object in the store aisle and returning to its location, trying on an item of clothing, etc.), the voltage may be compared to one or more reference or threshold voltages. In some implementations, the reference voltage(s) can be set by a user of the tag with an RFID reader. In some cases, when the voltage exceeds a reference voltage, then the control circuitry 214 can write an appropriate value for the motion identifier 222 in memory 220. In some cases, if the voltage is between two reference voltage values, the control circuitry 214 can identify a type of motion (e.g., motion associated with viewing the object briefly in the aisle and returning it to its location).

In some implementations, a counter can be employed in the RFID tag (e.g., in control circuitry 214) to determine motion and/or types of motion by the tag. For example, after a tag has been located and inventoried, the counter can be set to a zero value. If motion detection circuitry 240 subsequently outputs a signal indicating motion during a span of time $t_{md}$ (whether the tag is active or passive), the counter can be incremented to a value M. The span of time can have a duration in a range from 10 milliseconds to 1 second, for example. If the tag is passive, it may be powered up a number of times N in successive hops, for which the counter may increment if motion is detected in one or more of the successive hops. In some cases, the RFID tag can record the number of power-up times that occurred over the span of counter increments. The RFID tag can record one or both of M and N for the motion identifier 222 in memory 220. The RFID reader can, at any time, read the counter value (and also the number of power-ups if stored in memory 220) to evaluate tag motion.

Alternatively, the RFID reader may keep track of the number of hops to tags in a region. The value(s) of M (and N) can be used by the RFID reader to determine whether the tag has undergone motion. For example, a value of M greater than a threshold value can indicate that the tag has undergone motion. In some cases, the value(s) of M (and N) can be used by the RFID reader to distinguish types of motion that the tag has undergone. For example, a value of M greater than a first threshold value and less than a second threshold value (which may be based on the number of hops N) can indicate that the tag and attached object were jostled or viewed briefly and returned to a shelf, whereas a value of M greater than the second threshold, or greater than a third threshold above the second threshold, can indicate that the tag and attached object were handled for a long duration of time and possibly transported to a new location. According to some implementations, the RFID reader can issue a query with a Select command that includes a mask to solicit responses from tags based on the value of M (and optionally also N), so that only tags that have undergone motion respond to the query.

Figure 3:
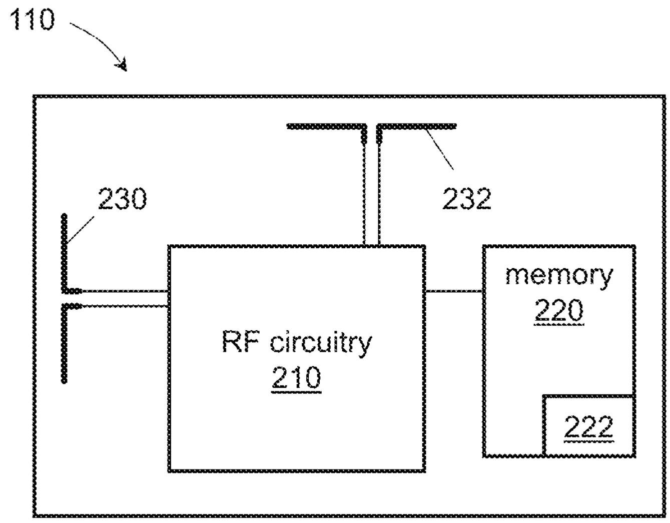
FIG. 3 depicts an RFID tag that can detect motion using antennas oriented to detect different polarization components of RF waves and that can be used in the RFID environment of FIG. 1.

FIG. 3 depicts another RFID tag 110 that uses differential detection of different polarizations to detect motion of the tag. The tag may be active or passive. The RFID tag 301 includes two dipole antennas 230, 232 that are oriented at angles with respect to each other (e.g., orthogonal to each other). Separate rectification circuitry is connected to each antenna to harvest energy from the RF field. The two antennas can receive power from different polarization components of the received RF field from an RFID reader 150 and emit differently polarized components in a backscattered RF field to the RFID reader. At the RFID tag 301, motion can be detected by time-dependent changes in the relative amounts of power detected by each antenna. For example, an RFID reader 150 can emit a polarized RF field that is received by the RFID tag's antennas 230, 232. If the tag is in motion and the antennas' orientations are rotating with respect to the polarized RF field, then the amount of power received by each antenna can change as a function of time.

The control circuitry 214 can evaluate the relative amount of power from each antenna as a function of time to detect motion of the tag. Power fluctuations due to attenuation of the RFID's reader's emitted RF field by passing objects (detected as common fluctuations in power from each antenna) can be screened out from being mistakenly identified as tag motion. For example, voltage levels that are indicative of power received by each antenna can be provided to inputs of a comparator or differential amplifier. Common mode power fluctuations (due to attenuation of both polarization components) should not change the output signal from the comparator or differential amplifier, whereas changes in relative amounts of received power will produce significant changes in the output signal. When motion is detected by the RFID tag 110, the control circuitry 214 can set the appropriate status of its motion identifier 222.

In yet another implementation, an RFID reader 150 and/or an RFID tag in communication with each other may be configured to detect motion of the RFID tag 110 based on power fluctuations in the signal received from the RFID tag or reader using a single antenna. For example, if an RFID tag 110 is in motion during communication with the reader and the orientation of the tag's antenna varies with time, then the amount of RF power received from the RFID reader and the amount of power returned from the tag can both vary with time. The RFID tag 110 can detect fluctuations in received power and determine that the tag may be in motion. If it is determined that the power fluctuations are due to tag motion, the tag may set its motion identifier to a motion status.

A possible source of fluctuations in received power using a single antenna can be RF attenuating or scattering objects that momentarily pass between the RFID reader 150 and RFID tag 110 during the communication. To filter out such power fluctuations which may produce a false positive motion indication, the RFID tag 110 can monitor for motion over an extended period of time $T_{ex}$ (e.g., detecting fluctuations in power that continue successively with each motion sensing operation during the period of time). If the power fluctuations persist for the period of time or longer than a threshold amount of time, then motion can be indicated for the tag. The duration of $T_{ex}$ can depend upon the environment where the tag is located. For example, in a retail setting, $T_{ex}$ may have a value in a range from 1 second to 100 seconds, though longer time intervals may be used. In the retail setting, false positive events may primarily occur from customers briefly passing in front of tags or examining an item near a tag. In a warehouse, where workers may work near a tag for a longer period of time (e.g., retrieving an item from a shelf or stocking a shelf near a tag), $T_{ex}$ may have a larger value (e.g., in a range from 50 seconds to 300 seconds).

III. Detecting Tag Motion by RFID Readers

In some implementations, tag motion can be detected by one or more RFID readers 150 and/or the master processor 180. An advantage of detecting tag motion by an RFID reader and/or master processor 180 is that special motion-sensing circuitry may not be needed at the RFID tag 110. A disadvantage of detecting tag motion by an RFID reader 150 is that the reader(s) may frequently poll RFID tags in a region to determine whether the tags are in motion. In some cases, tags may be polled (via singulation) sequentially, leading to longer spans of time to monitor for tag motion than approaches where motion detection is performed primarily by the tag. There are at least two ways for an RFID reader 150 and/or master processor 180 to detect motion of an RFID tag 110.

III.A. Detecting a Doppler-Shifted Backscattered Carrier Wave

Figure 4A:
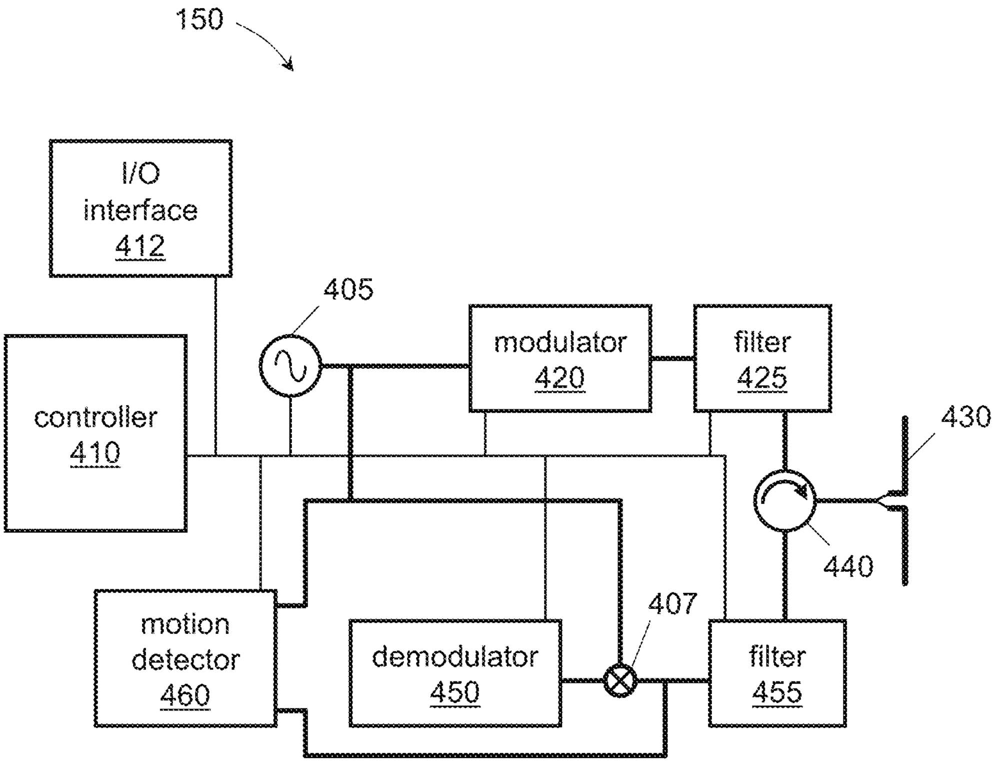
FIG. 4A depicts an example of RFID reader circuitry that includes a motion detector for detecting motion of an RFID tag responding to the reader.

An RFID reader 150 can be configured to detect Doppler shifting of a carrier wave backscattered from an RFID tag 110 or to detect a rate of change of a Doppler-shifted frequency. FIG. 4A illustrates an example of an RFID reader 150 having circuitry to detect a Doppler-shifted backscattered carrier wave from a tag. The RFID reader includes a controller 410, input/output (I/O) interface 412, a local oscillator 405, mixer 407, a signal modulator 420, a signal demodulator 450, band select filters 425, 455, a circulator 440, at least one antenna 430 and motion detector circuitry 460. A user can interact with and operate the reader using the I/O interface 412. The reader 150 can wirelessly transmit signals to RFID tags 110 and receive signals from the RFID tags using the same antenna 430. The circulator 440 can isolate transmitted signals from the received signal path, which includes band select filter 455.

The local oscillator 405 produces an RF carrier wave at a frequency that can be programmable by the controller 410. The modulator 420 can be controlled by the controller 410 to encode a signal from the controller 410 onto the RF carrier wave (e.g., using an amplitude shift keying (ASK) modulation scheme). A received signal from the antenna can be filtered with band select filter 455 to reject out-of-band noise and then mixed with the local oscillator 405 (using a mixer 407) to recover the baseband signal. The information can then be decoded from the baseband signal by signal demodulator 450 and processed by the controller 410.

The controller 410 may comprise at least one of a microprocessor, microcontroller, field-programmable gate array (FPGA), digital signal processor (DSP), programmable logic controller (PLC), application specific integrated circuit (ASIC), or logic circuitry, or some combination of these components. The controller 410 is adapted to execute code to implement various functionalities of the RFID reader 150. Functionalities include, but are not limited to, responding to user instructions input via the I/O interface 412, encoding signals (which can include tag commands) onto the RF carrier wave, decoding signals received from the RFID tags, processing decoded data, and communicating with at least one other device (e.g., a smartphone or computer) via the I/O interface. The controller 410 can be in communication with, and control operation of, one or more of the signal modulators 420, signal demodulator 450, band select filters 425, 455, and motion detector circuitry 460.

Figure 4B:
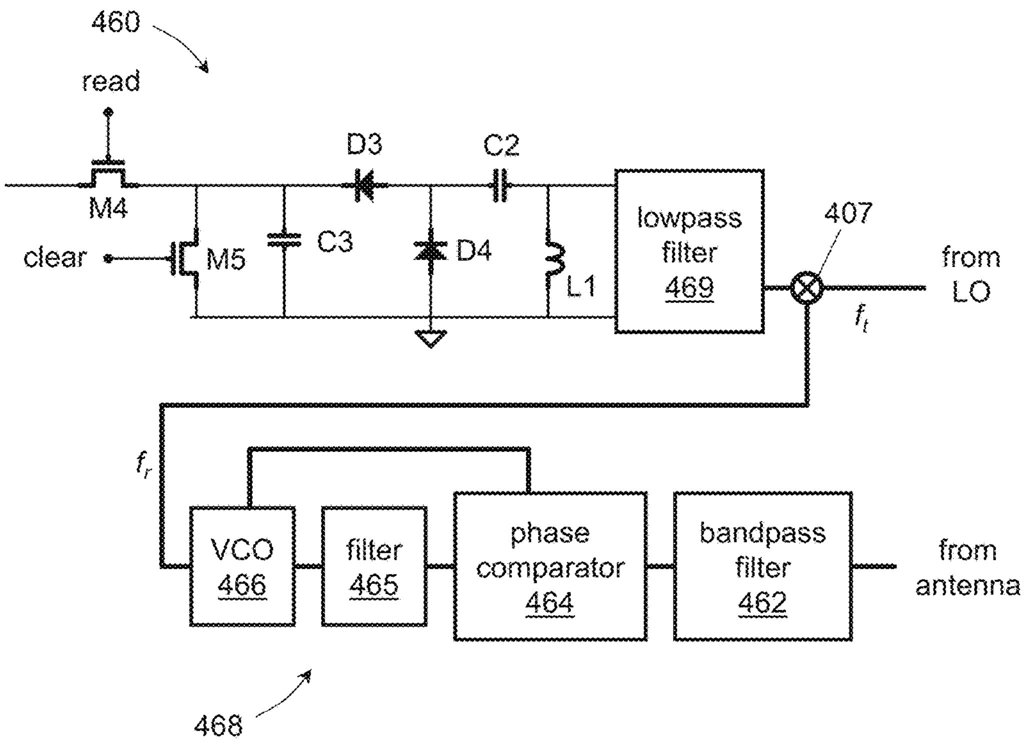
FIG. 4B depicts an example of motion detection circuitry than can be included in the RFID reader of FIG. 4A.

FIG. 4B illustrates an example of circuitry for the motion detector 460 that may detect Doppler shifting of a backscattered signal from a moving RFID tag 110. The motion detector can include a narrow bandpass filter 462 to selectively pass the RF carrier wave and reject sidebands or other unwanted frequency components. The output from the filter can be provided to a phase-locked loop (PLL) 468 comprising a phase comparator 464, loop filter 465, and voltage-controlled oscillator (VCO) 466. The filtered output from the phase comparator 464 provides an error signal that controls the VCO 466 in a manner to lock the phase and frequency of the VCO with the phase and frequency of the received RF carrier wave. In this manner, the bandpass filter 462 and PLL 468 can recover a clean RF carrier wave having a same frequency $f_r$ as the backscattered carrier wave. If the RFID tag is moving, the frequency $f_r$ is Doppler shifted compared to the frequency $f_t$ of the RF carrier wave used to transmit a signal to the RFID tag 110. For example, if the transmitted RF carrier wave frequency $f_t$ is about 900 MHz and the tag is moving directly toward or away from the RFID reader at about 1 meter/second, then the Doppler shifted backscattered carrier wave will differ in frequency from $f_t$ by about 6 Hz. The Doppler shift will be smaller if the tag moves at an angle other than directly toward or directly away from the RFID reader.

The local oscillator output and recovered backscattered carrier wave can be mixed with mixer 407. An output signal from the mixer can be provided to lowpass filter 469 to reject the sum frequency ($f_r+f_t$) and pass the difference frequency ($f_r-f_t$) to a DC block comprising capacitor C2 and inductor L1 in the example circuit. The component at the difference frequency (present if the RFID tag is moving) can be half-wave rectified (with diodes D3, D4) to charge capacitor C3. The controller 410 can read the voltage on C3 (using transistor M4) to determine whether tag motion has occurred and/or clear the accumulated charge on capacitor C3 using transistor M5.

Amplifiers may be included in the RFID reader circuitry to boost the received and/or transmitted signals. For example, a low-noise amplifier can be used at a front end of the received signal path (e.g., before band select filter 455) to boost the received signal level. An amplifier may also be used after the output of the mixer 407 in the motion detector circuitry to provide sufficient power so that the capacitor C3 will charge to a level detectable by the controller 410 after a selected amount of time (e.g., an amount of time that can be less than or equal to 1 second).

Motion detection by monitoring for a Doppler shifted backscattered carrier wave can be performed by the RFID reader 150 when transmitting an unmodulated RF carrier wave to the RFID tag and commanding the tag to backscatter an unmodulated carrier wave at a high power for a period of time during which Doppler shift detection can occur. Receiving an unmodulated backscattered wave at the RFID reader 150 can reduce the chance of signal modulations coupling through the motion detector circuitry and charging capacitor C3, incorrectly indicating motion of the RFID tag.

Instructing a tag to backscatter an unmodulated signal may be performed using a custom RFID command. The custom command can be executed after singulating a tag and obtaining knowledge of the tag's TID and/or EPC, in accordance with the UHF RFID Standard mentioned above. If the RFID reader 150 detects motion of an RFID tag 110, it can indicate that the tag has moved in a motion database that is maintained for all tags in the region that are inventoried by the RFID reader. For example, the RFID reader may record in a database the TID and/or EPC of each tag for which motion is detected by the reader during an interval of time. The interval may be a time since a previous inventory process for which tags were located. Alternatively, or additionally, the RFID reader can issue a command to the RFID tag to set a value for its motion identifier 222 that indicates the tag has moved. The motion database and/or motion identifier value can be used to reduce the number of tags to subsequently query and locate when updating inventory records.

In another approach, front-end analog filtering (e.g., using a band-select filter 455) may be used to select only Doppler-shifted carrier frequencies for signal demodulation by the demodulator 450 using the RFID circuitry of FIG. 4A. This may reject a large number of signals from tags which are not moving. In such a case, the motion detection circuitry of FIG. 4B may not be implemented in the reader. Instead, the RFID reader can learn the identity of the tags that respond to a standard Query command and whose signals are passed to the demodulator 450 by the filter 455. Any learned TIDs and/or EPCs are those of tags in motion.

III.B. Detecting Fluctuations in Relative Power of Polarization Components

Figure 5:
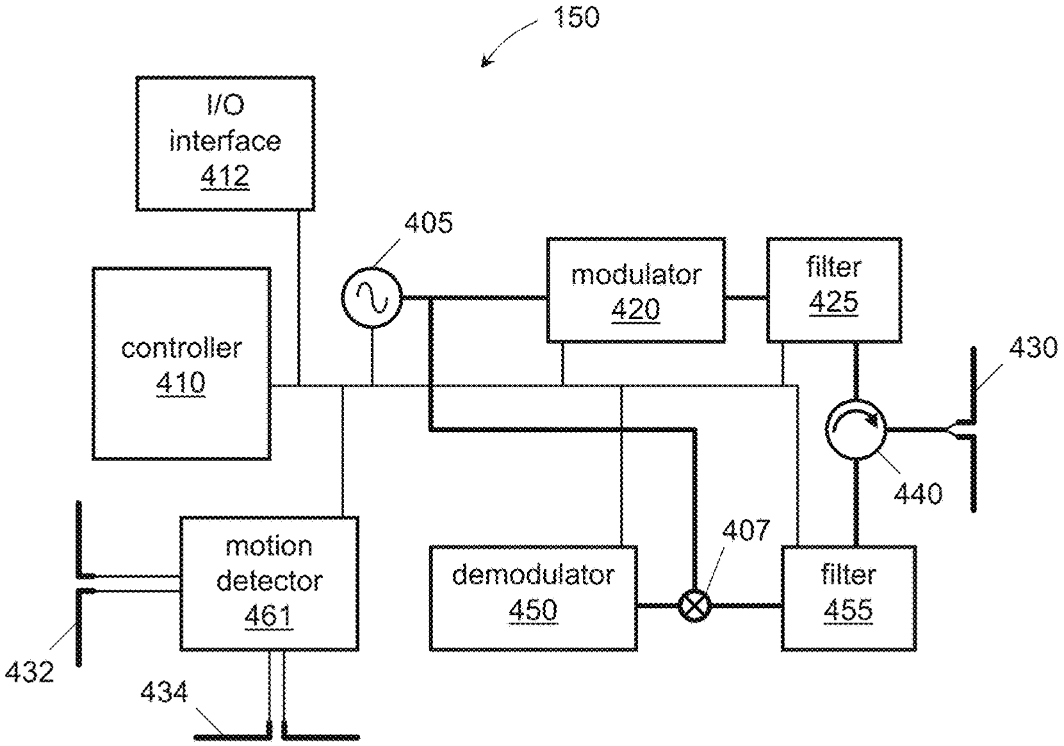
FIG. 5 depicts an example of RFID reader circuitry that includes a motion detector for detecting motion of an RFID tag responding to the reader.

FIG. 5 depicts an implementation of an RFID reader 150 that is configured to detect motion of an RFID tag 110 using polarization components of a backscattered or transmitted wave from the tag instead of detecting Doppler shifts. For implementations that detect relative power of polarization components, the RFID tag has at least one dipole antenna 230 and may be commanded to respond with only one dipole antenna so as to output a polarized RF wave. In some cases for motion detection, the RFID tag may be commanded to output an unmodulated, high-power level, continuous RF wave for a period of time during which the RFID reader can evaluate the received RF wave for changes in relative amounts of power in orthogonal polarization components. The RFID reader 150 includes a motion detector 461 connected to two dipole antennas 432, 434 oriented at different angles (e.g., orthogonal angles) with respect to each other so as to essentially detect different components of polarization of a backscattered wave from the RFID tag. When a tag responds to an interrogator command, the two antennas 432, 434 can receive signals having different components of polarization and different amounts of power.

As described above for the RFID tag 110 of FIG. 3, motion can be detected by time-dependent changes in the relative amounts of power received by each antenna 432, 434. If the RFID tag is in motion and its antenna's orientation is rotating, the polarization of the backscattered or transmitted signal from the RFID tag 110 will rotate. Then, the amount of power received by each antenna 432, 434 can change as a function of time. The controller 410 can evaluate the relative amount of power from each antenna as a function of time to detect motion of the tag. Power fluctuations due to attenuation of the RFID tag's emitted RF field by passing objects (detected as common fluctuations in power from each antenna) can be screened out from being mistakenly identified as tag motion.

If the RFID reader 150 detects motion of an RFID tag 110, it can indicate that the tag has moved in a motion database that is maintained for all tags in the region that are inventoried by the RFID reader. Alternatively, or additionally, the RFID reader can issue a command to the RFID tag to set a value for its motion identifier 222 that indicates the tag has moved. In some implementations, the RFID reader 150 may only determine that a tag is in motion or has moved when the RFID reader detects changes in relative power from each antenna for more than a threshold number of successive hops.

As mentioned above, an RFID reader 150 can be configured to detect motion of an RFID tag using a single antenna based on power fluctuations in a signal received from the RFID tag. The tag may be in communication with the RFID reader 150 and/or with another reader. If the RFID tag 110 is in motion while communicating and the orientation of the tag's antenna varies with time, then the amount of RF power received from the RFID tag 110 can vary with time. In some cases, the RFID reader 150 can detect such power fluctuations and determine that the tag is in motion when the power fluctuations continue for longer than a threshold amount of time. The RFID reader 150 can record in a motion database that the tag has moved and/or set a motion identifier 222 on the tag to a motion status.

An approach to distinguishing, by the RFID reader and/or master processor 180, between momentary passing of an object is to monitor two or more tags that are known to be in close proximity to an RFID tag 110 that is suspected to be in motion. For example, if a first RFID tag 110 exhibits power fluctuations in a signal received by the RFID reader 150, the reader or another reader can interrogate one or more second RFID tag(s) known to be in close proximity to the first RFID tag based on a most recent inventory record. If a single RFID reader is used, the RFID reader can alternate interrogations of the tags in time. If the first RFID tag 110 exhibits power fluctuations whereas the second tag(s) exhibit(s) no power fluctuations, then the RFID reader and/or master processor 180 can determine that the first RFID tag is in motion whereas the second tag(s) are stationary. However, if one or more of the second tag(s) exhibit(s) power fluctuations with similar characteristics to power fluctuations exhibited by the first RFID tag, then the RFID reader 150 and/or master processor can determine that the first tag and second tag(s) are not in motion. An advantage of detecting motion of an RFID tag 110 having a single antenna with an RFID reader is that the RFID tag does not have to be modified for the RFID reader to detect its motion.

At least one controller of the RFID reader 150 and/or master processor 180 can also detect and filter out power fluctuations caused by other moving objects. For instance, if the controller determines that the responses from several adjacent tags are fluctuating in amplitude in a coordinated or sequential fashion, it may determine that a person or object is travelling between the tags and the reader. In some cases, the controller can correlate motion of a person, object, or RFID tag detected by a still or video camera to fluctuations in tag response amplitude and update the inventory records accordingly.

III.C. Detecting Tag Motion Based on Subsequent Estimated Locations

In another approach, an RFID reader 150 can be configured to detect tag motion based on subsequent reads of a tag, each of which includes estimating tag location. For example, an RFID may execute a first query and estimate each responding tag's location based on the returned signal from each tag. A location estimate can be based on returned signal strength (RSSI), angle of arrival (AoA), some other signature of the returned signal (such as number of peaks in power of the returned signal as a function of angle of arrival), or some combination of these returned signal characteristics. At a later time, the RFID reader 150 can execute a second subsequent query and again estimate each responding tag's location based on the returned signal from each tag. A difference in a tag's estimated location between the first query and second query can be interpreted by the RFID reader 150 as motion of the tag.

IV. Detection of Motion and RFID Tag Inventories

As described above, knowing which RFID tags have moved within a population of inventoried tags can significantly reduce the total amount of time to update inventory records for the population of tags. Part of the reduction in time is due to the ability to use a smaller Q value in a Query command issued by the RFID tag reader. A significant portion of the reduction in time is due to the reduced time used for locating only a portion of the RFID tags in the population instead of locating all the tags in the population. In some cases, the reduction in time for locating only tags indicating motion can be significantly greater than the reduction in time due to the smaller Q value. Accordingly, a smaller Q value may not be used in some methods of updating an inventory record (e.g., identify all tags and locate only tags which have moved or are moving), and the reduction in time to update the inventory record can still be significant compared to performing an entire inventory process (which includes identifying all tags and locating all identified tags within range of the RFID reader(s)). Methods for performing inventories using the RFID tags 110 and RFID readers 150 configured to detect tag motion are described next.

Figure 6A:
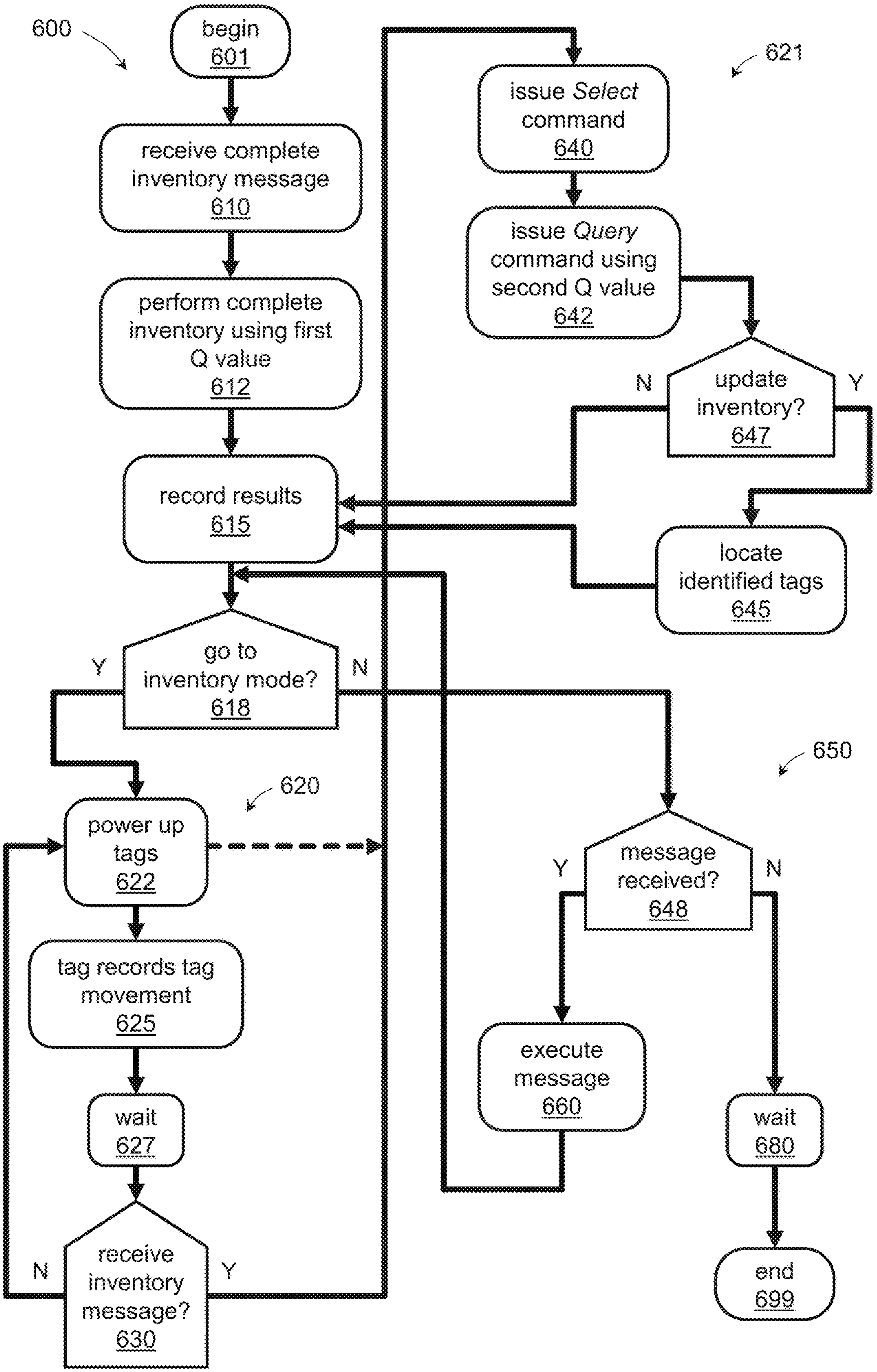
FIG. 6A illustrates acts that can be included in a method of detecting tag motion and updating inventory records when motion detection is performed primarily by RFID tags.

FIG. 6A depicts an example of a method 600 for performing and updating RFID tag inventories. The method pertains mainly to actions performed by an RFID reader 150 for which motion is detected primarily by the RFID tags 110. The method 600 can begin (act 601) with powering on an RFID reader 150. After reaching an operational state in which the RFID reader can receive messages (e.g., from a user or master processor 180), the reader can receive a message (act 610) to perform a complete inventory process for RFID tags 110 within range of the reader which may be located in a region of a shop, gallery, stockroom, warehouse, outdoor shopping area or exhibit area, etc. Messages received by the RFID reader 150 can include commands and data to instruct the reader to perform a task. Performing a complete inventory process can include identifying all tags in the region (e.g., learning all TIDs and/or EPCs using Query commands issued by the RFID reader) and locating all tags in the region (e.g., determining spatial coordinates or specific locations for each tag using techniques described or referenced herein). Results from the complete inventory process can be recorded (act 615) in an inventory database for the tags. Because a complete inventory process may take an appreciable amount of time, it may be performed at intervals of a day or longer (e.g., after the close of business each day, once a week, once a month). Performing a complete inventory process may be considered to be a deep scan of all RFID tags within range of the RFID reader(s). In some cases, a deep scan can be performed at shorter intervals and may be implemented based on data collected from a camera 160 and/or motion sensor within the RFID environment 100. For example, if images from a camera 160 and/or motion sensor indicate that there is no motion nor activity within a region of the RFID environment 100, then a deep scan can be performed within the region.

The RFID reader 150 can then receive a message and determine (act 618) based on the received message whether the reader will operate in an inventory mode (which includes a motion-detect mode 620 and inventory update mode 621) or another operation mode 650. In some implementations, an option for which mode to enter may be provided to a user of the RFID system as a user-selectable feature (e.g., selectable by a button or menu option that is presented on a display screen of the RFID reader or on a display screen of a master processor 180 in communication with one or more RFID readers 150). In some cases, the message to enter inventory mode or another operation mode may be determined at least in part on prior operation of the reader and/or time of day. For example, if the time of day is just prior to or at the start of business operation hours, then the RFID reader may automatically enter inventory mode.

In a motion-detect mode 620 portion of the inventory mode and for passive tags, the RFID reader(s) may power up (act 622) RFID tags 110 in the region continuously or at regular intervals for detection of tag motion. The powering up of tags can be done by one or more RFID readers 150 and/or another RF device that emits an RF wave (which can be unmodulated) of sufficient strength to power up RFID tags 110 in the region to operational status. While the tags are powered up, motion of each tag can be detected and/or indicated by any of the methods described above (e.g., those methods performed mainly by the RFID tag). When motion is detected or indicated by an RFID tag 110, the tag can record (act 625) in its motion identifier 222 that the tag has undergone motion or is in motion. For active RFID tags 110, the act of powering up the tags (act 622) can be omitted, since an active RFID tag can be capable of detecting and recording motion using its on-board power source.

The motion-detect mode 620 can include an interval of waiting (act 627), during which the RFID reader(s) emit no RF carrier wave. During this interval, the passive RFID tags may or may not power down. In some cases, the interval of waiting (act 627) may be short enough such that power stored on each RFID tag can maintain the tag in an operational status to detect motion until the RFID reader resumes emitting the RF carrier wave to power up the tags (622). The period of waiting may be in a range from 0.1 second to 10 minutes, depending on how motion detection is performed. During the waiting (act 627), the RFID reader(s) 150 may receive an inventory message (act 630). In some implementations, the interval of waiting (627) may not be implemented and the RFID reader(s) 150 and/or another RF device may emit the RF carrier wave until an inventory message or an interrupt message is received (act 630). If no inventory message or interrupt message is received, the acts of powering up tags (act 627), recording tag movement (act 625), and waiting (act 627) can be repeated cyclically. In some implementations, an interrupt message received while the RFID reader(s) is/are in motion-detect mode 620 can place the reader(s) in another operation mode 650 (e.g., at act 648).

In response to receiving an inventory message (act 630) in inventory mode, at least one of the RFID readers 150 can perform acts to learn the identities of tags in the region which have undergone motion or are in motion and to update the inventory records in an inventory update mode 621. For example, at least one of the RFID readers can issue a Select command (act 640), which can be in accordance with the UHF RFID Standards. The Select command can include a mask that effectively only solicits responses to a subsequent Query command from only tags having a motion identifier 222 matching the value of one or more corresponding bits in the mask.

The Select command can be followed by a Query command (act 642), which can be in accordance with the UHF RFID Standards. The Query command can be used by the RFID reader(s) to learn the identities (e.g., TIDs) of each tag and/or EPCs for the attached object in the region that has moved or is moving. The tags' responses can each be a standard tag response according to a time-slotted ALOHA protocol or other suitable protocol. As indicated above, the Q value can be reduced compared to a Q value that would otherwise be used to learn the identities of all tags in the region.

In another approach, a new motion-discriminating command (e.g., a Motion command) may be added to the standardized RFID commands. The new command can solicit responses from only those RFID tags within range of the RFID reader 150 issuing the command that have a motion identifier 222 indicating motion of the tag. For example, the new command can comprise a modified Query command that solicits tags to respond based on the value(s) of the motion identifier 222. Only the tags having a motion identifier value (or values) indicating tag motion would respond to the new command. The new command could be issued instead of the Select command (act 640) and Query command (act 642). Before, while, or after responding to the new command (or responding to an ACK, Query, Query, QueryRep, or QueryAdjust command) from the RFID reader, the RFID tag may clear its motion identifier 222 so that it is ready to detect motion again. When responding to the new command, the RFID tag may transmit its TID and/or EPC to the RFID reader. A second RFID reader in the RFID environment 100 can use the EPC or TID value to singulate the tag and assist in locating the tag when two or more readers are used to locate tags. In some cases, the motion identifier 222 may not be reset until the RFID tag has responded to more than one RFID reader. For example, the tag may be configured (during manufacture and/or by an RFID reader) to reset its motion identifier 222 after three responses to three new motion-discriminating commands where three RFID readers are used in the RFID environment 100 to determine tag location.

In some cases, the inventory message received (act 630) may be of two types: for a motion-identifying inventory process (for which identities of tags which have moved are learned but the tags are not located) or for an updating inventory process (for which identities and locations of tags which have moved are determined). If the message received (act 630) is for a motion-identifying inventory process, then the TIDs and/or EPCs learned by the reader(s) for tags which have moved or are moving can be recorded (act 615) in a database which can later be accessed when performing an updating inventory process. A motion-identifying inventory process can be performed at time intervals greater than those used for the motion-detect mode 620. Motion-identifying inventories may occur at intervals in a range from 1 second to 5 minutes, for example, though longer intervals are possible. The RFID reader(s) 150 may then resume in motion-detect mode 620 or go to another operation mode 650, depending on a message received prior to determining (act 618) in which mode to operate.

If the message received (act 630) is for an updating inventory process, then the RFID reader(s) can participate in singulating and locating (act 645) the moved or moving RFID tags (one by one) using tag-locating techniques described and/or referenced herein. In some implementations, tag locating can be performed as part of the Query process (act 642) (e.g., based at least in part on RSSI and/or AoA) as described elsewhere herein so that a separate step of locating tags (act 645) can be omitted. The location information can then be used (e.g., by the master processor 180) to record updated results (act 615) in the inventory database. The system may then resume in inventory mode or go to another operation mode 650, depending on whether or not a message is received to enter inventory mode before determining (act 618) in which mode to operate.

In some implementations, receipt of an inventory message (act 630) by the RFID reader 150 may occur in response to a user's input (e.g., a message issued by a user operating the system). In some cases, receipt of an inventory message (act 630) by the reader may occur automatically at predetermined intervals (e.g., issued by the master processor 180). A predetermined interval may be daily, half-day, hourly, or any other interval of time that may be selected by a user of the system. For example, motion identifying inventory processes may be performed hourly or at higher frequencies and an updating inventory process performed automatically at the end of the day following the close of business operations that involve movement of tagged objects, though an updating inventory can be performed more frequently. In some cases, an updating inventory processes may be performed at predetermined or user-selected times and operation in motion-detect mode 620 may not be implemented (as indicated by the dashed arrow in FIG. 6A). In some implementations, either or both of the motion identifying inventory process and the updating inventory process can be based on other factors (e.g., detection of motion and detection of no motion within range of an RFID reader by one or more cameras and/or one or more motion sensors or by other motion or activity detecting device(s)). Proceeding from powering up tags (act 622) to issuing a Select command (act 640) may occur when the RFID tags 110 are capable of harvesting energy from tag motion, as described in connection with FIG. 2D). Performing an updating inventory process may be considered a fast scan of a portion of the RFID tags (those which have moved or are moving) with range of the RFID reader(s) 150.

If the RFID reader(s) 150 do not receive a message to enter inventory mode prior to determining (act 618) in which mode to operate, then the RFID reader(s) can operate in another operation mode 650. In another operation mode, the RFID reader(s) can await receipt of messages (act 648) and execute messages (act 660) normally. The messages executed can be any command that complies with the current UHF RFID Standard, e.g., issue commands to communicate with one or more RFID tags. Other messages received (act 648) include messages to operate the RFID reader 150, e.g., a message to power down and turn off the RFID reader(s). The system can return to determining (act 618) in which mode to operate after executing a message (act 660). The RFID reader(s) 150 may further be programmed to enter an end state 699 (e.g., standby or power-off state) after waiting (act 680) for an interval of time (e.g., 10 minutes) during which no messages are received by the RFID reader(s).

Figure 6B:
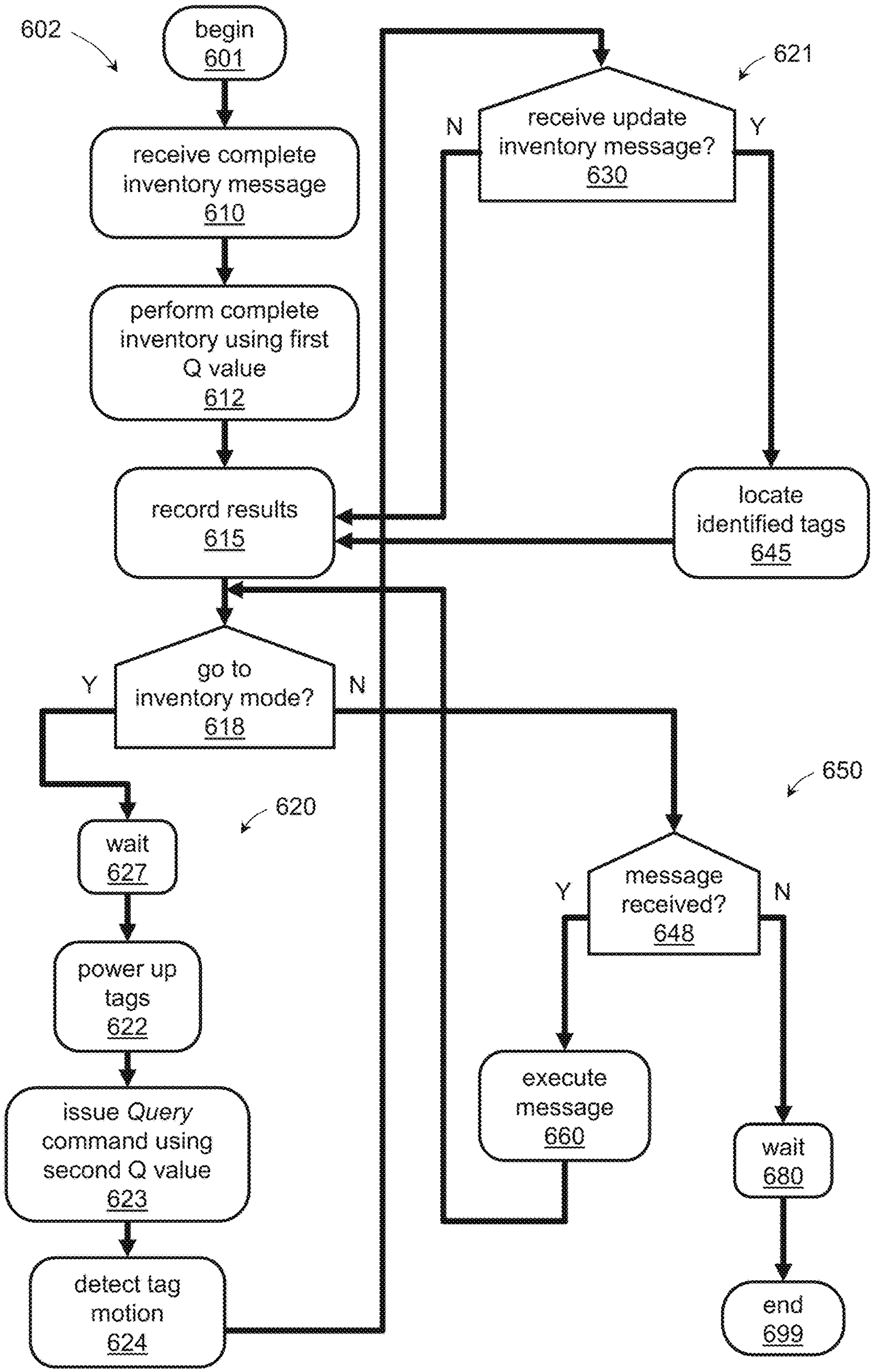
FIG. 6B illustrates acts that can be included in a method of detecting tag motion and updating inventory records when motion detection is performed primarily by an RFID reader.

FIG. 6B depicts a method 602 to detect motion of tags and update inventory records when motion of RFID tags 110 is detected primarily by the RFID reader(s) 150. The inventory mode can have different acts and a different ordering of acts than those in FIG. 6A. For example, when tag motion is determined by detecting changes in relative amounts of polarization components of a backscattered wave from a tag or by detecting the presence of a difference frequency from a Doppler-shifted backscattered carrier wave as described above, then the act 640 of issuing a Select command may not occur. Further, the act 642 of issuing a Query command may occur after powering up tags (act 622).

In some cases, detection of tag motion (act 624) may be performed by the RFID reader during or in combination with the Query command (act 623). For example, when each tag provides a response to the Query command, the RFID reader(s) 150 may process the response to detect changes in relative amounts of polarization components of the backscattered wave or the presence of a difference frequency using the tag's response. The occurrence of time-varying polarization components or a difference frequency can indicate motion of the tag as described above. The RFID reader(s) 150 can then provide the identities of tags which are moving for recordation in a motion database. The RFID reader(s) may or may not wait (act 627) for an interval of time with each cycle of the motion-detect mode 620 to space apart the Query commands.

In some cases, detection of tag motion (act 624) may be performed by the RFID reader following completion of a Query command (act 623). In such cases, the RFID reader may singulate each tag identified by the Query command and perform motion detection according to one or more methods described above (e.g., detection of a difference frequency and/or detection of changes in relative amounts of polarization components).

For the approach in which only Doppler shifted waves are passed to the signal demodulator, as described above, tag identities learned from the Query command (act 623) indicate which tags are moving in the region. In such an implementation, separate acts to detect tag motion by the RFID reader may or may not be used (e.g., singulating and detecting changes in relative amounts of polarization components in each tag's backscattered waves).

As with the method of FIG. 6A, a separate step of locating tags (act 645) may not be implemented. For example, tag location may be performed as part of the Query process and/or detecting tag motion (act 624) where tag location may be based, at least in part, on RSSI and/or AoA.

V. Reducing Q

Because the motion-detect mode 620 involves a Query command (and may involve singulating each tag) when motion of a tag is detected primarily by the RFID reader(s) 150 (according to the method 602 described in connection with FIG. 6B), it is beneficial to reduce the number of tags in a region to be queried. In one approach, reduction of the number of tags can be done by restricting an RFID's interrogation beam 155 to a sub-region of a region, as described above in connection with FIGS. 1A and 1B. For example, an RFID reader's interrogation beam can be directed to a portion of an aisle between two shelves or racks containing RFID tags 110*a*, 110*b*, 110*c*, 110*d*. A sub-region can be a portion of an aisle, an aisle, an area of a store, stockroom, or of a gallery, an area containing one or more fitting rooms, etc. In some cases, only tags 111 within the sub-region (e.g., an aisle) receive sufficient power to operate and respond to the Query. In some cases, the sub-region can include tags on the shelves or racks at the periphery of the sub-region that receive sufficient power to operate, whereas tags on other racks or shelves in the larger RFID environment 100 do not receive sufficient power to operate.

The value of the Q parameter used for the Query command issued to the sub-region can be reduced based on information obtained from a prior inventory record. For example, a prior inventory record can identify a total number N of the tags 110*a*, 110*b*, 110*c*, 110*d* on the shelves or racks in the sub-region. Since only a fraction f (between 0 and 1) of the tags may be moving at any given time, the Q value can be reduced further. For example, the value of Q can be based on f×N. If all tags in the sub-region may be powered up by the Query command, then the value of Q may be based on N.

In some implementations, sub-regions can be interrogated automatically in response to detection of motion in the sub-region. For example, the master processor 180 or control appliance can issue at least one message to cause at least one RFID reader to query tags in the sub-region following detection of motion by a camera 160 or sensor (e.g., infrared motion sensor) configured to detect motion in the sub-region. The master processor 180 can receive video or still images of the sub-region and process the video or still images to detect the presence of human or robotic activity in the sub-region. Alternatively, the master processor 180 can receive a signal from a motion sensor that indicates the presence of human or robotic activity in the sub-region. In response to detecting activity in the sub-region, the master processor 180 can issue messages to one or more RFID readers 150 to query RFID tags in the sub-region and determine whether any tags exhibit motion within the sub-region.

The value of Q can be reduced in addition to or alternatively from restricting the beam to a sub-region. Generally, the value of Q can be based on the estimated number of tags within a region or sub-region that are expected to be moving when an interrogation is made of the region or subregion and/or expected to have moved since a previous interrogation of the region or sub-region was made for purposes of detecting tag motion. There can be several factors that influence the estimate off tags that are undergoing and/or have undergone motion in the region or sub-region.

In some implementations, the value of Q can be based, at least in part, on the amount of time $T_i$ that passes between interrogations of the region or sub-region for detecting motion of tags. As such, the value of Q for purposes of detecting tag motion can vary with time during operation of the RFID system. For example, Q can increase to a larger value when the interval between successive interrogations of a region or sub-region increases, and Q can decrease to a smaller value when the interval between interrogations decreases. As such, there can be a benefit to interrogating regions at a higher rate, which allows Q to reduce to a smaller value. If, for example, the interval between successive interrogations of a region or sub-region is 5 seconds, then Q might be selected based on an expectation that it is unlikely that more than 10 tags would move within the region or sub-region during the 5-second interval.

Other factors that can influence the value of Q include the total number of tags $N_T$ in the region or sub-region, activity within the region, and time of day. The value of Q can be expressed, at least in part, as a fraction of the total number of tags in a region or sub-region. Without being bound to a particular theory, one way to select a value of Q is according to the following expression $$Q=f_1(t_d,T_i)\times N_T$$

where $f_1$ is a fractional value (between 0 and 1) that depends on time of day $t_d$ (which can reflect anticipated activity within the RFID environment 100) and on the amount of time $T_i$ that passes between interrogations of the region or sub-region for detecting motion of tags. Another way to select a value of Q is according to the following expression:

$$Q=f_2(N_c)\times N_T$$

where $f_2$ is a fractional value (between 0 and 1) that depends on the number of customers $N_c$ detected in the region or sub-region. The number of customers could be determined by the master processor 180 from images of the region or sub-region captured by one or more cameras 160.

In some implementations, the value of Q can be based, at least in part, on historical data for the region or sub-region. For example, it can be based on an average number of tags detected to be in motion over an interval of time occurring at the same time of day for a plurality of preceding days (which may or may not be the same day of different weeks). In some cases, the average value of Q may be determined based on a running average of Q used for a plurality of previous interrogations of the region or sub-region (e.g., the N previous Q values, where N can be an integer value in a range from 3 to 20).

The RFID reader 150 can be configured to reduce the value of Q on successive interrogations of a region or sub-region automatically. The reduction can be based on a number of signal collisions (undecodable responses) from tags detected during execution of a Query command and/or a number of time slots in which no responses are received. For example, if the reader detects no signal collisions and a significant number of unused time slots during execution of the Query command, then the reader can reduce the value of Q by 1 (or more) for a subsequent interrogation of the region or sub-region. The RFID reader 150 can also be configured to increase the value of Q for a subsequent Query if a significant number of signal collisions occur and/or if there are few unused time slots.

The reduction of Q can have multiple benefits in the RFID system of FIG. 1. Because it can reduce the amount of time to execute a Query command, the RFID reader can interrogate the region or sub-region more quickly, reducing the amount of time between interrogations during which tags in the region or sub-region can move. Reducing the amount of time between interrogations can exert a further downward influence on the value of Q. Further, reducing the time between interrogations can improve charging and recharging of tags in the region or sub-region, possibly preventing the tags from powering down completely and losing information in tag memory 220. Further, if location of tags can be determined from Query responses (e.g., by RSSI and/or AoA) then tracking of motion can be implemented with the shorter time intervals between interrogations.

VI. Powering Tags and Filtering Motion Results

For passive RFID tags 110, there are several ways to provide power to the tags when the system is operating in motion-detect mode 620, as mentioned above. While a passive RFID tag 110 is in a powered state, the tag has sufficient power to activate its motion detector 240 and to change the status of its motion identifier 222 to indicate that the tag is moving or has moved. For example, the motion identifier can be a single bit that is flipped from a 1 state (indicating no motion) to a 0 state (indicating motion) or vice versa. The motion identifier 222 can be initially set (upon manufacture) to a stationary, still, motionless, or static state. An RFID reader that communicates with the tag can set or reset the motion identifier to the stationary state (e.g., in response to determining the location of the tag and/or following a motion-selective query command).

For example, an RFID reader 150 or another RF transmitter 170 can emit or broadcast a continuous-wave (CW) RF output 175 to the region containing RFID tags 110 as shown in FIG. 1B. The RF output can be an unmodulated carrier wave like the one transmitted by the RFID reader at the beginning of a hop to power up the passive RFID tags 110. In some cases, the CW RF wave can be at a frequency that is outside of the frequency band used by the RFID reader 150 to communicate with RFID tags within range of the RFID reader 150. In Europe, the CWRF wave may be at a frequency below 865 MHz or above 868 MHz; in North America, the CWRF wave may be at a frequency below 902 MHz or above 928 MHz. The CWRF output can be provided continuously over a long duration (e.g., always emitted when the RFID reader(s) are operating in motion-detect mode 620 or emitted whenever the RFID reader is not communicating with tags). CWRF output can allow for continuous tracking of tag motion when in motion-detect mode 620.

In some implementations, the CWRF wave that is output by the RFID reader(s) to the tags for purposes of tracking tag motion carries no information to the RFID tags (e.g., no command signal). Further the CWRF wave may not be used to receive signals from the tags. In other implementations, the CWRF wave may be used to carry information to and receive information from the tags. For example, the CWRF wave that is used to singulate and communicate with one passive RFID tag 110 (e.g., during an interval of waiting (627)) can provide power to the tag and other tags in the region for purposes of motion detection.

Passive RFID tags 110 in motion-detect mode 620 can also be powered or charged by signals below the tags' activation thresholds. For instance, consider passive RFID tags 100 in a large environment, such as a warehouse, with many RFID readers. An RFID reader 150 at one corner of the environment (e.g., as in the upper left corner of FIG. 1B) may emit signals 155 that are too weak to activate tags in the opposite corner of the environment that is, the strengths or power levels of those signal is below the activation threshold of the tags in the opposite corner. Nevertheless, those signals may still reach the tags in the opposite corner (e.g., the lower right corner of FIG. 1B) at power levels high enough to power the tags' motion detection circuitry and/or charge the capacitance that powers the tags' motion detection circuitry.

If the readers interrogate tags in an alternating or round-robin fashion, with each reader broadcasting query signals to nearby tags (i.e., tags within range of that reader) in turn, at least one reader within the environment may be broadcasting at a given time. The signals from that reader can charge or power the motion detection circuitry for some, most, substantially all, or all of the tags within the environment, even those that are too far away from that reader to be activated by that reader. As a result, some, most, substantially all, or all of the tags within the environment may be charged and able to detect motion even though only a subset of the tags are being interrogated at a time.

The signals that charge tags in motion-detect mode 620, whether they are (out-of-band) CWRF signals or in-band signals below the tags' activation threshold, can be pulsed on and off. In some cases, the signals are pulsed on long enough to charge or power up the tags' motion detection circuitry, then pulsed off for a period too short for the tags' motion detection circuitry to power down. This allows the tags to stay in motion-detect mode 620 continuously and track motion continuously, except perhaps when commanded otherwise (e.g., during an inventory round) by a nearby reader. For example, a reader or other RF source can emit a CWRF output repeatedly in ON/OFF cycles with a duty cycle sufficient to maintain adequate power on each RFID tag to detect motion during an OFF portion of the cycle. Likewise, the query signals emitted by readers performing round-robin interrogations or queries of different subsets of tags may be strong enough and emitted frequently enough to keep other tags powered on for continuous motion detection. It may also allow for the RFID reader(s) to execute another message (e.g., singulating a tag and reading information from a tag) during intervals when the CWRF wave is not output for purposes of tracking motion.

Alternatively, the signals that charge tags can be pulsed on and off such that the tags do not remain in motion-detect mode 620 continuously. For example, a CWRF wave can be pulsed ON and OFF with a duty cycle that allows tag power to diminish to a level too low to operate the tag's motion detect circuitry, causing the tag to become deactivated between ON portions of the cycle. In some cases, the ON and OFF times can be adjusted by a user (either by setting the ON and OFF times or by selecting a pulse repetition frequency and duty cycle of the pulsed RF). Likewise, the readers may not emit commands often enough to keep tags that are outside the readers' activation rages powered continuously. In these cases, the tags may not be able to tracking tag motion continuously when in motion-detect mode 620. But if the pulse repetition frequency of the pulsed charging signals is high enough (e.g., high enough to charge the tags 1-60 times per minute), then the tags may still be able to sample motion when charged and in motion-detect mode 620.

An advantage of pulsing the charging signals such that the tags are not able to detect motion continuously is that the RFID reader(s) may consume less power because they transmit signals less frequently. Further, it may allow filtering out of motion that does not affect an inventory process or is not desired to be tracked. For example, there can be an appreciable amount of motion of objects on a shelf that are briefly moved (e.g., jostled to reach other objects, quickly viewed and returned) but not moved any significant distance from their inventoried location. Objects which are moved a significant distance (e.g., for fitting, check-out, or restocking) can be in motion for a significantly longer period of time (e.g., 5 seconds to an hour or more, depending on the customer's activity within a store, size of store, how the item is restocked, etc.). In some implementations, it can be beneficial to distinguish types of motion. For example, motion associated with one or more customers briefly viewing an object and returning it to a shelf (which may occur within a time span ranging from 2 seconds to 30 seconds, for example) may provide useful marketing analytic information to a vendor or manufacturer of the object.

As described above, when a Query is selective to only those tags in a region which have undergone motion or are in motion, the Q parameter used in the Query command can be significantly smaller than it would otherwise be if all tags in the region were queried. With a smaller Q value, the RFID reader interrogating the region can execute hops at a higher rate. If the reader uses beam steering to interrogate different sub-regions of the region in succession (e.g., scans the beam from sub-region to sub-region), the sub-regions can be scanned at a higher rate. The higher rates of executing hops and scanning sub-regions can shorten the time between intervals when the tags can receive power from the RFID reader to power up the tag and on-board motion detector. As such, the lower Q value allows for higher rates of motion detection and can permit motion tracking (detecting motion and location over time) of tags in some implementations.

One approach to filtering out insignificant motion is to provide the CWRF signal for a sub-second interval (or duration sufficient to power up RFID tags in the region and detect motion) followed by a multi-second lapse of power (e.g., a duration between 1 second and 10 seconds). In this scheme, tags that are in motion for longer periods of time (indicative of significant motion) have a higher probability of detecting motion. Though significant motion will more likely be detected, some insignificant motion may also be detected.

Figure 7:
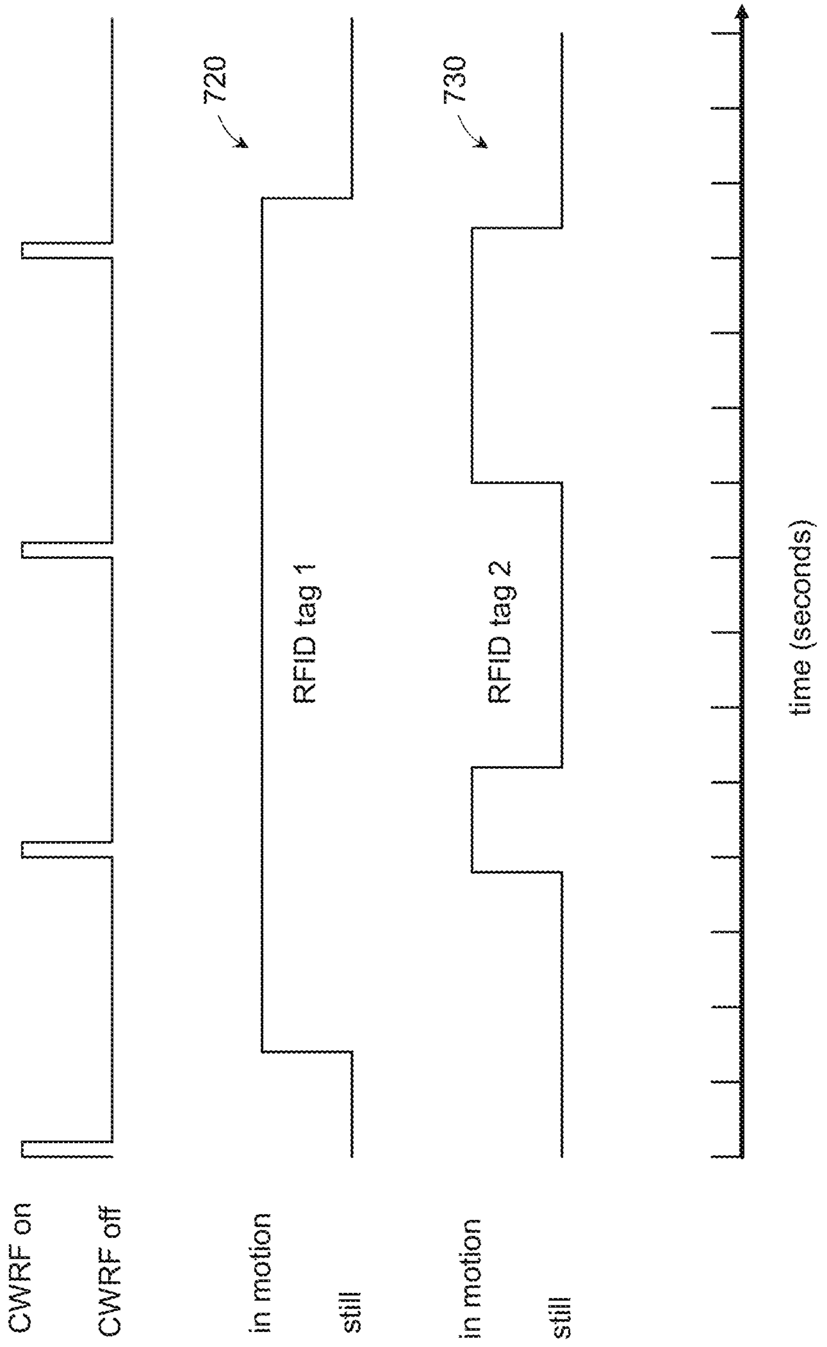
FIG. 7 illustrates traces for explaining filtering of motion detection events.

To reduce the amount of insignificant motion that is recorded for purposes of updating inventory records, additional filtering may be employed. FIG. 7 depicts an approach to filtering motion detection events. In one approach, two or more consecutive motion detections in successive periods when a tag is powered on can be used to discriminate significant motion from insignificant motion. In FIG. 7, the top trace 710 represents amounts of time for which the CWRF carrier wave (or a modulated carrier wave) is output from the RFID reader(s) (less than one second) and not output from the RFID reader(s) (over four seconds according to this example). Other ON and OFF times may be used. The second trace 720 indicates an interval of time during which a first RFID tag (RFID tag 1) is in motion (approximately 12 seconds) and intervals of time during which the tag is still. The third trace 730 indicates intervals of time during which a second tag (RFID tag 2) is in motion and intervals during which the second tag is still.

The motion of RFID tag 1 may be for an amount of time that is indicative of movement of the object (to which the tag is attached) to a check-out register, to a fitting room, or from a stock room. Motion of this tag would be detected in three consecutive ON intervals of the CWRF wave. In some implementations, the RFID tag 1 can include logic to determine whether two or more consecutive motion detections were received before changing its motion identifier 222 to indicate a moved or moving status. In some cases, the RFID reader is programmed to only record a moved or moving status for an identified tag in its motion database after receiving two or more consecutive motion detections for the tag. If the RFID tag maintains a motion identifier 222, the RFID reader 150 may instruct the tag to reset its motion identifier to a non-moved status after determining that the tag has moved or is moving in each ON interval.

The motion of RFID tag 2 may be for amounts of time indicative of jostling the object (to which the tag is attached) or quickly viewing the object and returning it to its location. For RFID tag 2, two consecutive motion detections would not occur so that motion of the tag may not be recorded in the motion identifier 222 by the tag nor in a motion database by the RFID reader 150.

When an RFID tag maintains power continuously during a motion-detect mode 620 according to the first or second methods of providing CWRF output described above (or outputting a modulated carrier wave), on-board filtering in the tag's RF circuitry 210 can be used to filter out detection of insignificant motion. For example, the motion identifier 222 status may not be changed until motion detection has exceeded a threshold duration of time.

As mentioned above, short-term viewing of an object by a customer and returning it to its location in the store can provide useful marketing analytic information. In some implementations, a counter can be employed on the RFID tag or RFID reader to keep track of the number of times motion is detected for a tag and attached object and the object is found to be at its same location. For such implementations, every motion detection event can be counted (e.g., trace 730 in FIG. 7 would indicate two motion events).

Because the number of RFID tags 110 that have undergone significant motion since a previous inventory process for which tags were located can be a fraction of the total number of RFID tags in a region, the value of the Q parameter used for the Query command (act 642) can be smaller than the value that would be chosen if all tags in the region were asked to respond. The fraction of total tags that have moved or are in motion can be estimated based on historical knowledge and/or other metrics (e.g., number of customers in the region during a time period since the previous inventory process, number of stocking clerks in the region during a time period since the previous inventory process, etc.) By reducing the value of Q, the amount of time to identify all tags relevant to updating inventory records can be reduced by roughly a factor of 2 for each reduction of Q by 1.

Further, the reduction in the number of tags to those that have moved or are moving can significantly reduce the amount of time taken to locate the tags that are relevant to accurately updating the inventory record. The inventory records can be updated quickly by locating the subset of tags for which significant motion has been indicated since the previous inventory process for which tags in the region were located. Inventory records for the remaining tags having motion identifiers that indicate no motion since the last interrogation (which can be a vast majority of the number of tags in a region) can remain unchanged. As such, accurate, rapid (minutes or seconds for a region), and/or frequent (as frequently as hourly or less) updating of inventory records can be possible for a large number of tags (hundreds to thousands).

Following a tag read, the tag's motion identifier 222 may or may not be reset to a stationary status as may be appreciated from the above discussion. The resetting of a tag's motion identifier 222 may depend on the method used to track motion and whether or not the tag is maintains power continuously during a motion-detect mode 620. Generally, once a tag is located, its motion identifier 222 may be reset by the RFID reader to a stationary status so that any further motion of the tag can be detected. If a tag read is for determining the presence of a tag in a region, then its motion identifier 222 may not be reset.

If a tag that has moved or is in motion is identified by one or more RFID readers but not located, then the motion identifier 222 for the tag may or may not be reset to a stationary status. If the motion identifier is reset to a stationary status, the tag's TID and/or EPC can be stored in a motion database that records the tag as having moved. At a subsequent time, the tag can be singulated (based on the stored TID and/or EPC) and located for purposes of performing an inventory process or tracking an object. By storing the TID and/or EPC and resetting the motion identifier 222, then the number of tags indicating motion on a subsequent motion-selective command can be reduced and a small Q value used for each Query command during the motion-detect mode 620.

If the tag's identity is not stored in a database in response to motion being detected for the tag, then the motion identifier 222 may not be reset. In this case, any successive Query command will identify the tag as having moved. Such an implementation can avoid maintaining a database associated with motion and may be used in an application where motion of a tag (whether or not it has moved during a time frame) is more important that determining the location of the tag. Such an application may involve works of art or museum articles.

In some cases, a motion database maintained by an RFID reader 150 and/or master processor 180 may record the number of times significant motion was detected for an object during intervals between complete inventory processes. Such information may be used to identify damaged or defective objects that were handled an unusual number of times by one or more customers (donned for fitting) and returned to a rack. In some cases, times at which significant motion was detected may be recorded.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of operating an RFID reader to detect at least one RFID tag that is in motion or has undergone motion in a population of RFID tags during a period of time, the method comprising:

selecting a first value for a first Q parameter, wherein the first Q parameter determines a number of time slots that each tag in the population of RFID tags can select from to respond to the RFID reader and wherein the first value is selected based on a total number of RFID tags in the population of tags;

issuing, by the RFID reader, a first query command using the first value at least once;

learning first identities of RFID tags in the population of RFID tags that are within range of the RFID reader and that respond to the first query command;

selecting a second value for a second Q parameter that is less than the first value for the first Q parameter, wherein the second value is based on a number of RFID tags in the population of RFID tags that are expected to move during the period of time;

issuing a select command that includes a digital mask having at least one bit to solicit a response from only the at least one RFID tag in the population of RFID tags, wherein the at least one bit is selective to identify motion detected by the at least one RFID tag;

issuing, by the RFID reader, a second query command using the second value for the second Q parameter at least once;

receiving responses to the second query command from only the at least one RFID tag that is in motion or has undergone motion in a population of RFID tags during the period of time; and learning, from the responses, second identities of the at least one RFID tag.

2. The method of claim 1, wherein the population of RFID tags includes passive RFID tags and for at least a portion of the period of time the RFID reader emits no RF wave.

3. The method of claim 1, wherein the population of RFID tags includes a passive RFID tag and for at least a portion of the period of time a power of the passive RFID tag depletes to an off state.

4. The method of claim 1, further comprising:

determining first locations for each RFID tag in the population of tags before the period of time;

providing the first identities and the first locations of each RFID tag in the population of RFID tags for an inventory record of the population of RFID tags;

after the period of time, determining at least one second location for the at least one RFID tag in the population of RFID tags; and providing the at least one second location for the at least one RFID tag in the population of RFID tags to update the inventory record of the population of tags.

5. A method of detecting motion by a radio-frequency identification (RFID) tag, the method comprising:

receiving, by the RFID tag, a continuous-wave (CW) signal from an RFID tag reader, the CW signal providing power to a resonant circuit in the RFID tag over a period of time;

detecting, by the RFID tag, different fluctuations in received power between a first polarization component of the CW signal and a second polarization component of the CW signal during the period of time;

determining, by the RFID tag, that the fluctuations in the received power indicate the RFID tag is moving; and in response to determining that the fluctuations in the received power indicate the RFID tag is moving, setting a motion-detection bit in a memory of the RFID tag to a first value.

6. The method of claim 5, further comprising:

receiving, by the RFID tag, a query addressed to only those RFID tags with motion-detection bits having values equal to the first value; and transmitting, by the RFID tag, a reply to the query.

7. The method of claim 5, wherein the determining comprises:

determining, by the RFID tag, that the fluctuations in power last for more than a threshold amount of time.

8. A method of scanning for a radio-frequency identification (RFID) tag, the method comprising:

detecting movement of the RFID tag;

in response to detecting movement of the RFID tag, changing a bit in a memory of the RFID tag from a first value to a second value indicating that the RFID tag has moved since last being queried;

receiving, by the RFID tag, a query for RFID tags with the bit set to the second value;

transmitting, by the RFID tag, a response to the query; and setting the bit in the memory of the RFID tag from the second value to the first value indicating that the RFID tag has not moved since last being queried.

9. The method of claim 8, wherein detecting movement of the RFID tag comprises sensing acceleration of the RFID tag with an accelerometer in or coupled to the RFID tag.

10. The method of claim 8, wherein the query is directed to only RFID tags that have moved since last being queried.

11. The method of claim 8, wherein setting the bit in the memory of the RFID tag from the second value to the first value occurs in response to the query.

12. The method of claim 1, further comprising:

obtaining, with a camera, one or more images of customers within a region containing the population of RFID tags during the period of time, wherein the second value for the second Q parameter is further based on the one or more images of customers.

13. A method of identifying and locating radio-frequency identification (RFID) tags that have moved since a first query, the method comprising:

broadcasting, by an RFID tag reader, a first query to a plurality of RFID tags in a region, wherein the first query uses a first value for a first Q parameter that is based on a total number of the plurality of RFID tags, the first Q parameter determining a number of time slots in which the plurality of RFID tags can respond to the first query;

broadcasting, by the RFID tag reader after a period of time, a second query to a plurality of RFID tags in the region, wherein the second query uses a second value for a second Q parameter that is smaller than the first value and is based on a number of the plurality of RFID tags that are expected to move during the period of time and wherein the second query is selective to only RFID tags in the plurality of RFID tags that have moved during the period of time;

receiving, by the RFID tag reader, a response to the second query from an RFID tag of the plurality of RFID tags that has moved since receiving the first query; and estimating, based on the response, a location of the RFID tag.

14. The method of claim 13, wherein the RFID tag reader is a first RFID tag reader, and further comprising:

receiving, by a second RFID tag reader, the second query and the response to the second query.

15. The method of claim 13, further comprising:

obtaining, with a camera, one or more images of customers within the region containing the plurality of RFID tags during the period of time, wherein the second value for the second Q parameter is further based on the one or more images of customers.

16. A method of identifying and locating radio-frequency identification (RFID) tags that have moved since a previous query, the method comprising:

transmitting, by an RFID tag reader, a new query to a plurality of RFID tags, the new query requesting information from a subset of the plurality of RFID tags in the plurality of RFID tags that have moved since the previous query;

receiving, by the RFID tag reader, a response to the new query from a first RFID tag of subset of the plurality of RFID tags, the response indicating that the first RFID tag has moved since receiving the previous query; and in response to receiving the response indicating that the first RFID tag has moved since receiving the previous query, estimating a current location of the first RFID tag and/or a change in location of the first RFID tag based at least in part on the response from the first RFID tag to the new query.

17. The method of claim 16, further comprising:

receiving, by the RFID tag reader, a response to the new query from a second RFID tag of the second plurality of RFID tags, the response indicating that the second RFID tag has moved since receiving the previous query; and transmitting, by the RFID tag reader, instructions to the second RFID tag to stop transmitting.

18. A method of locating radio-frequency identification (RFID) tags that have moved since last queried, the method comprising:

acquiring at least one image of an object;

determining, based on the at least one image, that the object and an RFID tag attached to the object have moved since the RFID tag was last queried;

identifying, based on the at least one image, a region to which the RFID tag has been moved;

transmitting, by an RFID tag reader, a query to the region to which the RFID tag has been moved;

detecting, by the RFID tag reader, a response from the RFID tag to the query; and estimating a location of the RFID tag based on the response.

19. The method of claim 18 wherein the RFID tag reader is a second RFID tag reader, the method further comprising:

detecting, by a first RFID tag reader, motion of the RFID tag attached to the object; and acquiring the at least one image of the object in response to detecting the motion of the RFID tag.

20. The method of claim 18, further comprising:

performing, by the RFID tag reader, an inventory in the region to which the RFID tag has been moved in response to identifying the region to which the RFID tag has been moved.

* * * * *